United States Patent
Amaitis et al.

(10) Patent No.: US 7,534,169 B2
(45) Date of Patent: May 19, 2009

(54) SYSTEM AND METHOD FOR WIRELESS GAMING SYSTEM WITH USER PROFILES

(75) Inventors: Lee M. Amaitis, London (GB); Joseph M. Asher, New York, NY (US); Robert F. Bahrampour, New York, NY (US); Darrin M. Mylet, Tampa, FL (US); Alan B. Wilkins, Raleigh, NC (US); Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 11/199,835

(22) Filed: Aug. 9, 2005

(65) Prior Publication Data

US 2007/0060305 A1    Mar. 15, 2007

Related U.S. Application Data

(60) Provisional application No. 60/697,861, filed on Jul. 8, 2005.

(51) Int. Cl.
    A63F 9/24 (2006.01)
(52) U.S. Cl. ...................................................... 463/39
(58) Field of Classification Search .................. None
    See application file for complete search history.

(56) References Cited

U.S. PATENT DOCUMENTS

| | | | | |
|---|---|---|---|---|
| 4,266,214 | A | 5/1981 | Peters, Jr. ............... | 340/323 R |
| 5,024,441 | A | 6/1991 | Rousseau ................ | 273/176 R |
| 5,415,416 | A | 5/1995 | Scagnelli et al. ............ | 273/439 |
| 5,507,485 | A | 4/1996 | Fisher ....................... | 273/32 R |
| 5,613,912 | A | 3/1997 | Slater .......................... | 463/25 |

(Continued)

FOREIGN PATENT DOCUMENTS

EP    0 840 639 B1    7/1996

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US06/26343 filed Jul. 7, 2006 (10 pages), mailed Jan. 19, 2007.

(Continued)

*Primary Examiner*—John M Hotaling, II
*Assistant Examiner*—O. Deodhar
(74) *Attorney, Agent, or Firm*—Glen R. Farbanish

(57) ABSTRACT

A gaming system is provided. The gaming system allows users to access applications via gaming communication devices coupled to a communication network. At least a portion of the network may be wireless. The gaming applications include gambling, financial, entertainment service, and other types of transactions. The system may include a user location determination feature to prevent users from conducting transactions from unauthorized areas. The gaming system may incorporate a user profile feature according to which certain information regarding users of the system may be maintained. Such information can include, without limitation, information relating to preferences, finances, activities participated in by the users, and trends and habits of the users.

65 Claims, 5 Drawing Sheets

U.S. PATENT DOCUMENTS

| | | | |
|---|---|---|---|
| 5,653,634 A | 8/1997 | Hodges | 463/1 |
| 5,654,746 A | 8/1997 | McMullan, Jr. et al. | 348/6 |
| 5,707,286 A | 1/1998 | Carlson | 463/16 |
| 5,738,583 A | 4/1998 | Comas et al. | 463/40 |
| 5,904,619 A | 5/1999 | Scagnelli et al. | 463/17 |
| 5,910,047 A | 6/1999 | Scagnelli et al. | 463/17 |
| 5,921,865 A | 7/1999 | Scagnelli | 463/17 |
| 5,999,808 A | 12/1999 | LaDue | 455/412 |
| 6,104,815 A | 8/2000 | Alcorn | 380/251 |
| 6,210,274 B1 | 4/2001 | Carlson | 463/16 |
| 6,233,448 B1 | 5/2001 | Alperovich et al. | 455/417 |
| 6,248,017 B1 | 6/2001 | Roach | 463/37 |
| 6,272,223 B1 | 8/2001 | Carlson | 380/251 |
| 6,277,026 B1 | 8/2001 | Archer | 463/42 |
| 6,277,029 B1 | 8/2001 | Hanley, Jr. | 473/131 |
| 6,287,202 B1 | 9/2001 | Pascal et al. | 463/42 |
| 6,428,413 B1 | 8/2002 | Carlson | 463/16 |
| 6,468,155 B1 | 10/2002 | Zucker et al. | 463/23 |
| 6,508,710 B1 | 1/2003 | Paravia et al. | 463/42 |
| 6,524,189 B1 | 2/2003 | Rautila | 463/40 |
| 6,527,641 B1 | 3/2003 | Sinclair et al. | 463/39 |
| 6,542,750 B2 | 4/2003 | Hendrey et al. | 455/456 |
| 6,554,707 B1 | 4/2003 | Sinclair et al. | 463/39 |
| 6,556,819 B2 | 4/2003 | Irvin | 455/410 |
| 6,575,834 B1 | 6/2003 | Lindo | 463/40 |
| 6,582,302 B2 * | 6/2003 | Romero | 463/12 |
| 6,585,597 B2 | 7/2003 | Finn | 463/40 |
| 6,614,350 B1 | 9/2003 | Lunsford | 340/572.1 |
| 6,618,706 B1 | 9/2003 | Rive et al. | 705/30 |
| 6,628,939 B2 | 9/2003 | Paulsen | 455/414 |
| 6,634,942 B2 | 10/2003 | Walker | 463/20 |
| 6,676,522 B2 | 1/2004 | Rowe | 463/42 |
| 6,682,421 B1 | 1/2004 | Rowe et al. | 463/25 |
| 6,729,956 B2 | 5/2004 | Wolf et al. | 463/25 |
| 6,745,011 B1 | 6/2004 | Hendrickson | 455/67.11 |
| 6,749,505 B1 | 6/2004 | Kunzle et al. | 463/30 |
| 6,754,210 B1 | 6/2004 | Ofek | 370/389 |
| 6,755,742 B1 | 6/2004 | Hartman | 463/40 |
| 6,756,882 B2 | 6/2004 | Benes et al. | 340/323 R |
| 6,778,820 B2 | 8/2004 | Tendler | 455/414.2 |
| 6,793,580 B2 | 9/2004 | Sinclair et al. | 463/39 |
| 6,800,031 B2 | 10/2004 | Di Cesare | 463/40 |
| 6,802,772 B1 | 10/2004 | Kunzle et al. | 463/2 |
| 6,837,789 B2 | 1/2005 | Garahi et al. | 463/29 |
| 6,843,412 B1 | 1/2005 | Sanford | 235/379 |
| 6,843,725 B2 | 1/2005 | Nelson | 463/40 |
| 6,846,238 B2 | 1/2005 | Wells | 463/39 |
| 6,863,610 B2 | 3/2005 | Vancraeynest | 463/41 |
| 6,868,396 B2 | 3/2005 | Smith et al. | 705/27 |
| 6,884,162 B2 | 4/2005 | Raverdy | 463/1 |
| 6,893,347 B1 | 5/2005 | Zilliacus | 463/41 |
| 6,896,618 B2 * | 5/2005 | Benoy et al. | 463/25 |
| 7,022,017 B1 | 4/2006 | Halbritter et al. | 463/42 |
| 7,033,276 B2 | 4/2006 | Walker et al. | 463/40 |
| 7,035,653 B2 | 4/2006 | Simon et al. | 455/466 |
| 7,097,562 B2 | 8/2006 | Gagner | 463/42 |
| 7,124,947 B2 | 10/2006 | Storch | |
| 7,147,558 B2 | 12/2006 | Giobbi | 463/25 |
| 7,158,798 B2 | 1/2007 | Lee et al. | 455/456.3 |
| 7,229,354 B2 | 6/2007 | McNutt et al. | 463/29 |
| 7,270,605 B2 | 9/2007 | Russell et al. | 463/42 |
| 2001/0018663 A1 | 8/2001 | Dussell et al. | 705/9 |
| 2001/0027130 A1 | 10/2001 | Namba et al. | 463/42 |
| 2001/0031663 A1 | 10/2001 | Johnson | 463/42 |
| 2001/0036858 A1 | 11/2001 | McNutt et al. | |
| 2001/0049275 A1 | 12/2001 | Pierry et al. | 455/414 |
| 2002/0037767 A1 | 3/2002 | Ebin | 463/25 |
| 2002/0065097 A1 | 5/2002 | Brockenbrough | 455/552 |
| 2002/0068631 A1 | 6/2002 | Raverdy | 463/42 |
| 2002/0074725 A1 | 6/2002 | Stern | 273/274 |
| 2002/0111210 A1 | 8/2002 | Luciano | 463/29 |
| 2002/0111213 A1 | 8/2002 | McEntee et al. | 463/42 |
| 2002/0119817 A1 | 8/2002 | Behm | 463/17 |
| 2002/0124182 A1 | 9/2002 | Basco | 713/200 |
| 2002/0125886 A1 | 9/2002 | Bates et al. | 324/307 |
| 2002/0142846 A1 | 10/2002 | Paulsen | 463/43 |
| 2002/0143960 A1 | 10/2002 | Goren | 709/229 |
| 2002/0147049 A1 | 10/2002 | Carter, Sr. | 463/42 |
| 2002/0151344 A1 | 10/2002 | Tanskanen | 463/17 |
| 2002/0155884 A1 | 10/2002 | Updike | 463/25 |
| 2002/0160838 A1 | 10/2002 | Kim | 463/42 |
| 2002/0165020 A1 | 11/2002 | Koyama | 463/17 |
| 2002/0191017 A1 | 12/2002 | Sinclair | 345/740 |
| 2002/0198044 A1 | 12/2002 | Walker | 463/25 |
| 2003/0006931 A1 | 1/2003 | Mages | 342/357.06 |
| 2003/0008662 A1 | 1/2003 | Stern et al. | 455/456 |
| 2003/0013438 A1 | 1/2003 | Darby | 455/419 |
| 2003/0028567 A1 | 2/2003 | Carlson | 708/250 |
| 2003/0032434 A1 | 2/2003 | Willner et al. | 455/456 |
| 2003/0036428 A1 | 2/2003 | Aasland | 463/29 |
| 2003/0040324 A1 | 2/2003 | Eldering et al. | 455/456 |
| 2003/0060286 A1 | 3/2003 | Walker | 463/42 |
| 2003/0064712 A1 | 4/2003 | Gaston | 455/414 |
| 2003/0064805 A1 | 4/2003 | Wells | 463/39 |
| 2003/0069940 A1 | 4/2003 | Kavacheri et al. | 709/217 |
| 2003/0078101 A1 | 4/2003 | Schneider et al. | 463/42 |
| 2003/0087701 A1 | 5/2003 | Paravia et al. | 463/42 |
| 2003/0109306 A1 | 6/2003 | Karmarkar | 463/40 |
| 2003/0114218 A1 | 6/2003 | McClintic | 463/25 |
| 2003/0139190 A1 | 7/2003 | Steelberg et al. | 455/456 |
| 2003/0140131 A1 | 7/2003 | Chandrashekhar | 709/223 |
| 2003/0148812 A1 | 8/2003 | Paulsen et al. | 463/42 |
| 2003/0157976 A1 | 8/2003 | Simon et al. | 463/1 |
| 2003/0162580 A1 | 8/2003 | Cousineau | 463/17 |
| 2003/0176162 A1 | 9/2003 | Planki | 455/3.01 |
| 2003/0176218 A1 | 9/2003 | LeMay et al. | 463/25 |
| 2003/0228895 A1 | 12/2003 | Edelson | 463/1 |
| 2003/0228907 A1 | 12/2003 | Gatto et al. | 463/42 |
| 2003/0228910 A1 | 12/2003 | Jawaharlal et al. | 463/42 |
| 2003/0236120 A1 | 12/2003 | Reece | 463/42 |
| 2004/0002355 A1 | 1/2004 | Spencer | 455/550 |
| 2004/0002383 A1 | 1/2004 | Lundy | 463/42 |
| 2004/0002386 A1 | 1/2004 | Wolfe et al. | 463/42 |
| 2004/0002843 A1 | 1/2004 | Robarts | 703/13 |
| 2004/0029635 A1 | 2/2004 | Giobbi | 463/30 |
| 2004/0048613 A1 | 3/2004 | Sayers | 455/426.2 |
| 2004/0063497 A1 | 4/2004 | Gould | 463/42 |
| 2004/0068441 A1 | 4/2004 | Werbitt | 705/16 |
| 2004/0068532 A1 | 4/2004 | Dewing | 709/200 |
| 2004/0092306 A1 | 5/2004 | George et al. | 463/29 |
| 2004/0092311 A1 | 5/2004 | Weston et al. | 463/42 |
| 2004/0097283 A1 | 5/2004 | Piper | 463/17 |
| 2004/0097287 A1 | 5/2004 | Postrel | 463/41 |
| 2004/0104845 A1 | 6/2004 | McCarthy | 342/463 |
| 2004/0111369 A1 | 6/2004 | Lane et al. | 705/40 |
| 2004/0127289 A1 | 7/2004 | Davis et al. | 463/42 |
| 2004/0132530 A1 | 7/2004 | Rutanen et al. | 463/42 |
| 2004/0162124 A1 | 8/2004 | Barton | 463/1 |
| 2004/0162144 A1 | 8/2004 | Loose | 463/42 |
| 2004/0192438 A1 | 9/2004 | Wells et al. | 463/29 |
| 2004/0198403 A1 | 10/2004 | Pedersen et al. | 455/517 |
| 2004/0209660 A1 | 10/2004 | Carlson | 463/1 |
| 2004/0209690 A1 | 10/2004 | Bruzzese | 463/39 |
| 2004/0219961 A1 | 11/2004 | Ellenby | 463/1 |
| 2004/0224769 A1 | 11/2004 | Hansen | 463/40 |
| 2004/0225565 A1 | 11/2004 | Selman | 705/14 |
| 2004/0229685 A1 | 11/2004 | Smith. | 463/29 |
| 2004/0248637 A1 | 12/2004 | Liebenberg et al. | 463/16 |
| 2004/0259626 A1 | 12/2004 | Akram | 463/17 |
| 2004/0259631 A1 | 12/2004 | Katz et al. | 463/25 |
| 2004/0266533 A1 | 12/2004 | Gentles et al. | |
| 2005/0001711 A1 | 1/2005 | Doughty et al. | 340/5.74 |
| 2005/0003893 A1 | 1/2005 | Hogwood et al. | 463/42 |
| 2005/0014554 A1 | 1/2005 | Walker et al. | 463/20 |

| | | | | | | |
|---|---|---|---|---|---|---|
| 2005/0020336 A1 | 1/2005 | Cesare ............................ 463/9 | JP | 2002189831 | 7/2002 | |
| 2005/0026670 A1 | 2/2005 | Lardie .......................... 463/16 | JP | 2003078591 | 3/2003 | |
| 2005/0026697 A1 | 2/2005 | Balahura ....................... 463/42 | JP | 2003166050 | 6/2003 | |
| 2005/0054439 A1 | 3/2005 | Rowe et al. ................... 463/29 | JP | 2002024979 | 8/2003 | |
| 2005/0059397 A1 | 3/2005 | Zhao ....................... 455/435.2 | JP | 2003228642 | 8/2003 | |
| 2005/0059485 A1 | 3/2005 | Paulsen ........................ 463/29 | JP | 2005005936 | 1/2005 | |
| 2005/0086301 A1 | 4/2005 | Eichler et al. | WO | WO 95/24689 | 9/1995 | |
| 2005/0096109 A1 | 5/2005 | McNutt et al. .................. 463/6 | WO | WO 96/00950 | 1/1996 | |
| 2005/0096133 A1 | 5/2005 | Hoefelmeyer et al. ......... 463/40 | WO | WO 96/15837 | 5/1996 | |
| 2005/0107022 A1 | 5/2005 | Wichelmann ................ 452/77 | WO | WO 98/09694 | 3/1998 | |
| 2005/0130728 A1 | 6/2005 | Nguyen ........................ 463/16 | WO | WO 99/04873 | 2/1999 | |
| 2005/0137014 A1 | 6/2005 | Vetelainen .................... 463/42 | WO | WO 99/08762 | 2/1999 | |
| 2005/0159212 A1 | 7/2005 | Romney et al. ............... 463/25 | WO | WO 00/77753 A1 | 12/2000 | |
| 2005/0170890 A1 | 8/2005 | Rowe et al. ................... 463/42 | WO | WO 01/17262 A1 | 3/2001 | |
| 2005/0170892 A1 | 8/2005 | Atkinson | WO | WO 01/40978 A2 | 6/2001 | |
| 2005/0181859 A1 | 8/2005 | Lind et al. .................... 463/17 | WO | WO 01/48712 A1 | 7/2001 | |
| 2005/0181870 A1 | 8/2005 | Nguyen et al. ................ 463/29 | WO | WO 01/48713 A1 | 7/2001 | |
| 2005/0192077 A1 | 9/2005 | Okuniewicz ................ 463/17 | WO | WO 01/84817 | 11/2001 | |
| 2005/0197189 A1 | 9/2005 | Schultz ........................ 463/42 | WO | WO 01/89233 | 11/2001 | |
| 2005/0209002 A1 | 9/2005 | Blythe et al. .................. 463/42 | WO | WO 02/010931 | 2/2002 | |
| 2005/0215306 A1 | 9/2005 | O'Donnell et al. ............ 463/17 | WO | WO 02/021457 | 3/2002 | |
| 2005/0282638 A1 | 12/2005 | Rowe .......................... 463/42 | WO | WO 02/039605 | 5/2002 | |
| 2006/0068917 A1 | 3/2006 | Snoddy et al. ................ 463/42 | WO | WO 02/041199 | 5/2002 | |
| 2006/0095790 A1 | 5/2006 | Nguyen et al. .............. 713/186 | WO | WO 02/065750 A2 | 8/2002 | |
| 2006/0121970 A1 | 6/2006 | Khal .......................... 463/16 | WO | WO 02/071351 | 9/2002 | |
| 2006/0135259 A1 | 6/2006 | Nancke-Krogh et al. ...... 463/42 | WO | WO 02/077931 | 10/2002 | |
| 2006/0148560 A1 | 7/2006 | Arezina et al. ................ 463/29 | WO | WO 02/101486 | 12/2002 | |
| 2006/0163346 A1 | 7/2006 | Lee et al. ..................... 235/380 | WO | WO 03/013678 A1 | 2/2003 | |
| 2006/0178216 A1 | 8/2006 | Shea et al. .................... 463/42 | WO | WO 03/027970 | 4/2003 | |
| 2006/0189382 A1 | 8/2006 | Muir et al. .................... 463/29 | WO | WO 2004/000428 A1 | 12/2003 | |
| 2006/0194589 A1 | 8/2006 | Sankisa ................... 455/456.1 | WO | WO 2004/003810 | 1/2004 | |
| 2006/0205489 A1 | 9/2006 | Carpenter et al. ............. 463/29 | WO | WO 2004/014506 A1 | 2/2004 | |
| 2006/0234631 A1 | 10/2006 | Dieguez .................... 455/41.2 | WO | WO 2004/023253 A3 | 3/2004 | |
| 2006/0234791 A1 | 10/2006 | Nguyen et al. ................ 463/16 | WO | WO 2004/073812 | 9/2004 | |
| 2006/0246990 A1 | 11/2006 | Downes ........................ 463/16 | WO | WO 2004/104763 | 12/2004 | |
| 2006/0247039 A1 | 11/2006 | Lerner et al. .................. 463/29 | WO | WO 2004/114235 A1 | 12/2004 | |
| 2006/0247041 A1 | 11/2006 | Walker et al. ................. 463/29 | WO | WO 2005/015458 | 2/2005 | |
| 2006/0252530 A1 | 11/2006 | Oberberger et al. ........... 463/29 | WO | WO 2005/026870 | 3/2005 | |
| 2006/0287098 A1 | 12/2006 | Morrow et al. ................ 463/42 | WO | WO 2005/031627 A1 | 4/2005 | |
| 2007/0015564 A1 | 1/2007 | Walker et al. ................. 463/16 | WO | WO 2005/031666 | 4/2005 | |
| 2007/0021213 A1 | 1/2007 | Foe et al. ...................... 463/42 | WO | WO 2005/036425 | 4/2005 | |
| 2007/0060312 A1 | 3/2007 | Dempsey et al. .............. 463/25 | WO | WO 2005/050574 | 6/2005 | |
| 2007/0099697 A1 | 5/2007 | Nelson ........................ 463/29 | WO | WO2007/008601 | 1/2007 | |
| 2007/0099703 A1 | 5/2007 | Terebilo ....................... 463/42 | WO | WO 2007/008601 A2 | 1/2007 | |
| 2007/0117634 A1 | 5/2007 | Hamilton et al. .............. 463/42 | | | | |
| 2007/0136817 A1 | 6/2007 | Nguyen ........................ 726/26 | | | | |
| 2007/0167237 A1 | 7/2007 | Wang et al. ................... 463/42 | | | | |
| 2007/0190494 A1 | 8/2007 | Rosenberg ................... 434/11 | | | | |
| 2007/0213120 A1 | 9/2007 | Beal et al. ..................... 463/25 | | | | |
| 2008/0015013 A1 | 1/2008 | Gelman et al. | | | | |
| 2008/0026829 A1 | 1/2008 | Martin et al. | | | | |

FOREIGN PATENT DOCUMENTS

| | | |
|---|---|---|
| EP | 0506873 | 3/2000 |
| EP | 1066868 | 1/2001 |
| EP | 1 202 528 A3 | 5/2002 |
| EP | 1475755 | 12/2003 |
| EP | 1475756 | 11/2004 |
| EP | 1 531 646 A1 | 5/2005 |
| GB | 2391432 | 2/2004 |
| GB | 2391767 | 2/2004 |
| GB | 2 406 291 | 3/2005 |
| JP | 2000049046 | 2/2000 |
| JP | 2000218125 | 7/2000 |
| JP | 2000326491 | 10/2000 |
| JP | 2000345435 | 11/2000 |
| JP | 2000387614 | 12/2000 |
| JP | 2001236458 | 8/2001 |
| JP | 2002032515 | 1/2002 |
| JP | 2002107224 | 2/2002 |
| JP | 2002133009 | 5/2002 |
| JP | 2002149894 | 5/2002 |

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US06/26600 filed Jul. 7, 2006 (8 pages), mailed Jan. 19, 2007.

*Notification of Transmittal of the International Search Report and the Written Opinion of the International Searching Authority, or the Declaration* for International Application No. PCT/US06/26346; 8 pages, Mar. 29, 2007.

*Notification of Transmittal of the International Search Report and the Written Opinion of the International Searching Authority, or the Declaration* for International Application No. PCT/US05/05905; 10 pages, Apr. 10, 2007.

*Notification of Transmittal of the International Search Report and the Written Opinion of the International Searching Authority, or the Declaration* for International Application No. PCT/US06/26350; 8 pages, Apr. 27, 2007.

Office Action for U.S. Appl. No. 11/210,482, entitled "System and Method for Peer-to-Peer Wireless Gaming", mail date Jul. 27, 2007.

Business Wire; *Home Gambling Network Inc., With U.S. Patent 5,800,268—Business/Gambling—HGN and UUNET, a WorldCom/ MCI Company, Reach a Mutually Satisfactory Resolution in Patent Suit*; 2 pages, Mar. 17, 2003.

PR Newswire; *Nokia N-Gage (TM) Mobile Game Deck—The Revolutionary Gaming Experience; Major Global Games Publishers Excited to Publish on Wireless Multiplayer Platform*; 3 pages, Feb. 6, 2003.

Business Wire; *GoldPocket Interactive Launcehs EM Mobile Matrix, Industry's First Fully Synchronous Interactive Television and Massively Multi-Player Gaming Solution*; 2 pages, Mar. 17, 2003.

Brand Strategy; *The National Lottery has Announced that UK Consumers Will be Able to Purchase Tickets Using the Internet, TV and Mobile Phones*; (Launches & Rebrands); ISSN 0965-9390; 1 page, Apr. 2003.

PR Newswire; *Ideaworks 3D Appointed by Eidos Interactive to Develop Blockbuster Line-Up for Nokia N-Gage Mobile Game Deck*; 2 pages, May 23, 2003.

Telecomworldwide; *New Mobile Lottery Service Launched by mLotto*; 1 page, Oct. 30, 2003.

Singh, et al.; *Anywhere, Any-Device Gaming*; Human Interface Technology Laboratory; National University of Singapore; 4 pages, 2004.

Wu, et al.; The Electronic Library; *Real Tournament—Mobile Context—Aware Gaming for the Next Generation*; vol. 22; No. 1; ISBN 0-86176-934-1; ISSN 0264-0473; 11 pages, 2004.

*Precision Marketing*; vol. 16; No. 11; ISSN 0955-0836; 2 pages, Jan. 9, 2004.

Online Reporter; *GTECH Takes Lottery Mobile*; 1 page, Feb. 28, 2004.

Personal and Ubiquitous Computing; *Human Pacman: a Mobile, Wide-Area Entertainment System Based on Physical, Social, and Ubiquitous Computing*; 12 pages, May 2004.

PR Newswire; *M7 Networks Partners With Terraplay to Deliver Real-Time Multiplayer Gaming Functionality to its Community Services Offerings*; 2 pages, Jun. 1, 2004.

China Telecom; *Win Win Gaming Inc. Announces Agreement to Provide Wireless Lottery and Entertainment Content in Shanghai*; vol. 11; No. 9; 2 pages, Sep. 2, 2004.

Business Wire; *EA Announces Next Step Into Mobile Gaming; Digital Bridges Named as Strategic Partner for Distribution of Mobile Interactive Entertainment in Europe; North and South America*; 3 pages, Sep. 2, 2004.

Wireless News; *Mobile Casinos, Lotteries Good News for Mobile Revenues*; 2 pages, Feb. 23, 2005.

Business Wire; *MobileGamingNow, Inc. Announces the Launch of the First Ever Mobile Phone Interactive, Multi-Player Gaming System for Poker*; 2 pages, Apr. 4, 2005.

Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages, Apr, 21, 2005.

Business Wire; *July Systems' Play2Win Interactive Game Service Launched on UK's MobileGaming.com; Speedy Customer Deployments Now Possible With July's New UK Mobile Retailing Infrastructure*; 2 pages, May 4, 2005.

Pending U.S. Appl. No. 10/835,995 entitled *System and Method for a Convenience Gaming* by Lee M. Amaitis, et al; 46 total pages, filed Apr. 29, 2004.

Pending U.S. Appl. No. 11/063,311 entitled *System and Method for Convenience Gaming* by Lee M. Amaitis, et al; 44 total pages, filed Feb. 21, 2005.

Pending U.S. Appl. No. 11/199,831 entitled *System and Method for Wireless Gaming System With Alerts* by Lee M. Amaitis, et al; 66 total pages, filed Aug. 8, 2005.

Pending U.S. Appl. No. 11/201,812 entitled *System and Method for Wireless Gaming With Location Determination* by Lee M. Amaitis, et al; 53 total pages, filed Aug. 10, 2005.

Pending U.S. Appl. No. 11/199,964 entitled *System and Method for Providing Wireless Gaming as a Service Application* by Lee M. Amaitis, et al; 76 total pages, filed Aug. 9, 2005.

Pending U.S. Appl. No. 11/256,568 entitled *System and Method for Wireless Lottery* by Joe M. Asher, et al; 32 total pages, filed Oct. 21, 2005.

Pending U.S. Appl. No. 11/210,482 entitled *System and Method for Peer-to-Peer Wireless Gaming* by Lee M. Amaitis, et al; 72 total pages, filed Aug. 24, 2005.

Pending U.S. Appl. No. 11/557,125 entitled *System and Method for Convenience Gaming* by Lee M. Amaitis, et al; 44 total pages, filed Nov. 7, 2006.

Pending U.S. Appl. No. 11/557,131 entitled *System for Convenience Gaming* by Lee M. Amaitis, et al; 44 total pages, filed Nov. 7, 2006.

*Australian Patent Office; Examination Report* for Singapore Patent Application No. 0605830-9; 5 pages, Jul. 7, 2008.

*PCT Notification of Transmittal of the International Search Report and the Written Opinion of the International Searching Authority* for International Application No. PCT/US07/66873; 4 pages, Aug. 4, 2008.

*PCT Notification of Transmittal of the International Search Report and the Written Opinion of the International Searching Authority* for International Application No. PCT/US2008/057239; 8 pages, Aug. 7, 2008.

USPTO Office Action for U.S. Appl. No. 11/418,939, 12 pages. Aug. 20, 2008.

Australian Patent Office: Examination Report for Singapore patent Application No. 0605830-9; 5 pages. Jul. 7, 2008.

PCT Notification of Transmittal of the International Search report and the Written Opinion of the International Searching Authority for International Application No. PCT/US07/66873; 4 pages. Aug. 4, 2008.

PCT Notification of Transmittal of the International Search report and the Written Opinion of the International Searching Authority for International Application No. PCT/US07/057239; 8 pages. Aug. 7, 2008.

\* cited by examiner

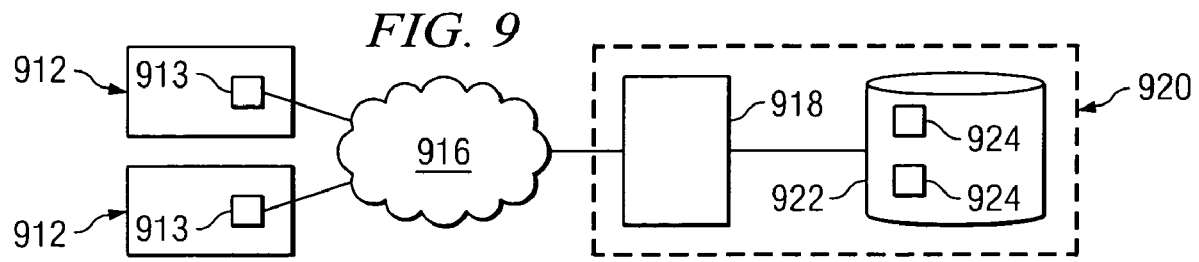
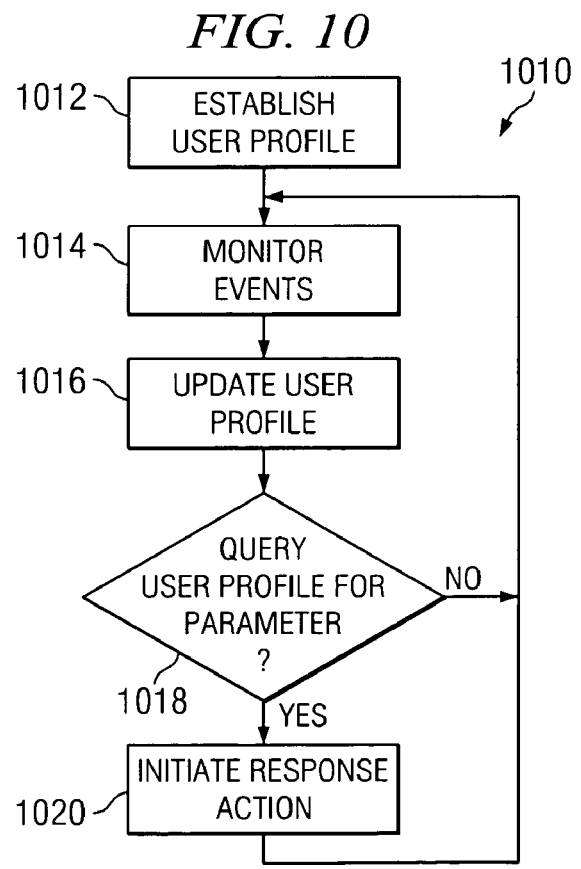

SYSTEM AND METHOD FOR WIRELESS GAMING SYSTEM WITH USER PROFILES

RELATED APPLICATIONS

This application claims priority to U.S. Provisional Application Ser. No. 60/697,861 filed Jul. 8, 2005, entitled "Enhanced Wireless Gaming System," and to U.S. application Ser. No. 11/063,311 filed on Feb. 21, 2005, entitled "System and Method for Convenience Gaming," which is a continuation-in-part of U.S. application Ser. No. 10/835,995 filed on Apr. 29, 2004, entitled "System and Method for Convenience Gaming," which claims priority to and incorporates in its entirety by reference U.S. Provisional Application Ser. No. 60/547,507 filed on Feb. 25, 2004 and U.S. Provisional Application Ser. No. 60/549,187 filed on Mar. 1, 2004.

TECHNICAL FIELD

The present invention relates generally to the field of gaming and, more particularly to a gaming system and method incorporating a wireless network.

BACKGROUND

The gaming industry allows people to participate in a variety of gaming activities within the limits of state and federal law. Possible gaming activities include gambling, such as that provided by casinos. Casino-type gambling activities include, but are not limited to, slot machines, table games, poker, keno, and other gaming activities that allow for the placement of bets. Events also may be wagered on and may include, for example, sporting events, such as horse or auto racing, and athletic competitions such as football, basketball, baseball, boxing, and golf. Gaming can also include non-wagering games and events, such as lottery contests. In a casino environment, the participation in such gaming activities is generally limited by a participant's physical location. For example, participants in casino-type gambling activities must be present at a gaming machine or at a gaming table within the casino in order to place a bet. Similarly, people interested in wagering on sporting events or athletic competitions in a casino environment must place bets through a sports book that is located in the casino.

SUMMARY

Various embodiments of the invention are directed to gaming systems, which may be wireless gaming systems. According to certain embodiments, the gaming system is operable to make various gaming activities available to one or more users over a communications network and to display information associated with the activities to the users on gaming devices. The gaming devices may be mobile communication devices. Gaming activities may include any activities referred to or contemplated herein and are not limited to games. Gaming activities can include, for example, games, gambling activities, sporting events, purchase of goods or services, and accessing concierge services.

In accordance with an example embodiment, a gaming system includes at least one processor, at least one data storage device electronically coupled to the processor; and at least one gaming device in electronic communication with the processor. The at least one data storage device stores at least one user profile. The at least one user profile comprises at least one data set associated with a user of the gaming system. The at least one data set represents at least one characteristic of the user. The system is operable to recognize an event and update the at least one data set in response to the event.

In accordance with another example embodiment, a method is provided for maintaining a user profile in a gaming system. The method includes steps. One step includes establishing an initial profile. Another step includes storing at least a portion of the user profile on a data storage device. Another step includes recognizing the occurrence of an event. Another step includes updating the user profile in response to the event.

In accordance with another example embodiment, software is provided for managing a user profile in a gaming system. The software operable to establish an initial profile. The software is also operable to store at least a portion of the user profile on a data storage device. The software is also operable to recognize the occurrence of an event. The software is also operable to update the user profile in response to the event.

Various embodiments of the present invention may benefit from numerous advantages. It should be noted that one or more embodiments may benefit from some, none, or all of the advantages discussed below.

One advantage is that the system enables remote, wireless, mobile gaming over a secure network. Another advantage is that the system enables remote, wireless, mobile, gaming, while preventing gaming by unauthorized users and from unauthorized locations. Another advantage is the enablement of a gaming system accessible by remote, wireless, mobile users, wherein the system includes gaming communication devices used by the users and connected to a communication network, and wherein a portion of the communication network is movable.

Certain embodiments present the advantage of enabling an entity that provides wireless gaming services to track various gaming parameters related to one or more users of the gaming services. Among other things, this enables the entity to customize the gaming experience for the users. It also enables the gaming provider to more efficiently manage information associated with activities engaged in by the users. Among other things, this leads to more accurate and useable data for such things as tracking, management, service provision and back-end applications. Tracking of user profile information also allows for more efficient activities such as audits, reporting, system updates, and modification to the gaming services be provided.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 9 illustrates a wireless gaming system with user profiles in accordance with an embodiment of the present invention; and FIG. 10 illustrates a method of providing user profiles in a wireless gaming system in accordance with an embodiment of the present invention.

DETAILED DESCRIPTION

Figure 1:
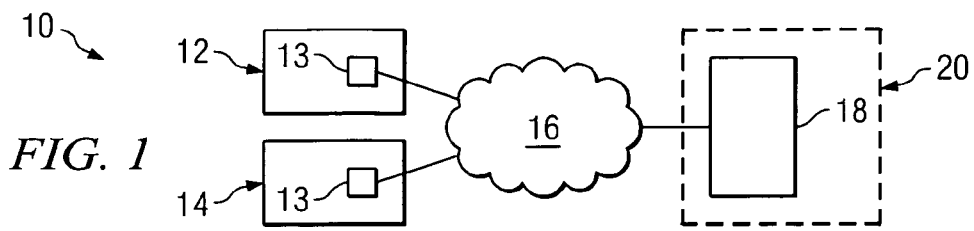
FIG. 1 illustrates a gaming system according to an embodiment of the present invention.

A gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include WiFi and WiMax networks. In one embodiment, the gaming system communications network is entirely independent of the Internet. In another embodiment, the gaming system operation makes minimal use of the Internet, such that only information for which there is no security issues is transmitted via the Internet and/or information may be encrypted. Preferably, the communications network enables users to participate in gaming from remote locations (e.g., outside of the gaming area of a casino). Also, the system may enable users to be mobile during participation in the gaming activities. Preferably, the system has a location verification or determination feature, which is operable to permit or disallow gaming from the remote location depending upon whether or not the location meets one or more criteria. The criterion may be, for example, whether the location is within a pre-defined area in which gaming is permitted by law.

According to certain embodiments, the wireless gaming system can incorporate a user profile element. One or more user profiles may be created, maintained, and modified, for example, on one or more of the servers of the gaming system. Generally, the user profiles include information relating to respective users. The information may be maintained in one or more databases. The information may be accessible to the gaming server and/or to one or more mobile devices. The devices which may access the information may, according to certain embodiments, include gaming devices or gaming management devices. Gaming management devices may include wireless devices used by casino staff to provide gaming services or gaming management services.

At least certain embodiments include software and/or hardware to enable the provision, modification, and maintenance of one or more user profiles. Thus, one or more user profiles may each comprise a set of data maintained in a data storage device. The data set(s) for each respective user profile may reflect any of a number of parameters or pieces of information, which relate to the particular user(s) corresponding to the profile(s). Although not intended to be exhaustive, such information may include, for example, gaming activity preferences, such as preferred game and/or game configuration, preferred screen configuration, betting preferences, gaming location preferences, dining and other service preferences, and so forth. The information may also include user identity information, such as name, home address, hotel name and room number, telephone numbers, social security numbers, user codes, and electronic files of fingerprint, voice, photograph, retina scan, or other biometric information. User profile information may also include information relating to the user, but not determined by the user or the user's activities. Such information may include any information associated with, or made part of, a profile. For example, an entity such as a casino, may include as part of a profile certain rules governing the distribution of promotions or offers to the user. User profile information can include any codes, account numbers, credit information, approvals, interfaces, applications, or any other information which may be associated with a user. Thus, user profile information may include any information that is particular to a given user. For example, profile information may include the location(s) at which a particular user has played, skill levels, success levels, types of games played, and betting styles, and trends of information relating to the user's activities.

In particular embodiments, user profile information can include concierge or other service information that is associated with a user. Concierge services may include restaurant services, entertainment services, hotel services, money management services, or other appropriate services that may be offered to the user of a gaming device. For example, restaurant services may include, without limitation, services that allow the user to order drinks, order food, make reservations, or perform other restaurant related activities. As another example, entertainment services may include, without limitation, services that allow the user to purchase show tickets, arrange appointments or services, virtually shop, arrange transportation, or perform other entertainment related activities. Hotel services may include, for example, services that allow the user to check in, check out, make spa appointments, check messages, leave messages, review a hotel bill, or perform other guest-related activities. Money management services may include, for example, services that allow the user to transfer funds, pay bills, or perform other money management activities.

The gaming system may be configured to establish a new profile for any user who is using a gaming device for the first time. Alternatively, a new profile may be established for a prior user who has not played for a predetermined time period. The gaming system may set up the profile, monitor user activities, adjust the profile, and adjust information (such as graphics) displayed to the user. The gaming system may be configured to use the profile information to alter the presentation of gaming information to the user. For example, if a prior user has returned to the gaming system, the system may consult the profile for the user and determine that in the prior session of gaming the user lost money on craps but won money on blackjack. Based on this information, the system may adjust the default gaming screen and present a blackjack table for the user. As a further example, the profile information may indicate that the majority of the user's prior blackjack time was spent on $25 minimum tables. The system may, accordingly, make a further adjustment to the gaming environment and make the blackjack table being presented a $25 table. In this sense, the gaming system enables personalized wireless gaming based on one or more criteria maintained in a user profile.

The user profiles may be established, maintained, and periodically updated as necessary to enable a gaming provider to provide an enhanced, current, and/or customized gaming experience. Updates may be undertaken based on any suitable trigger, such as the occurrence of an event, the occurrence of a user activity, or the passage of a certain predetermined time period. Any or all of the profile information may be updated.

As shown in FIG. 1, for example, gaming system 10 includes at least one user 12. The system may include additional users such that there is at least a first user 12 and a second user 14. Multiple users may access a first gaming system 10, while other multiple users access a second gaming system (not shown) in communication with first gaming system 10. Users 12 and 14 preferably access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

Preferably, software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user. Software resident on the computer is preferably able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. In particular embodiments, network 16 may include a Land Area Network (LAN), a Wide Area Network (WAN), a Metropolitan Area Network (MAN), a Personal Area Network (PAN), the Internet, an Intranet, an Extranet, or any combination of these or other suitable communication networks. Some specific technologies which may be used include, without limitation, Code Division Multiple Access (CDMA), Time Division Multiple Access (TDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), Blue Tooth, or cable modem technologies. These are examples only and one of ordinary skill will understand that other types of communication techniques are within the scope of the present invention. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In at least one embodiment, the communication of gaming information takes place without involvement of the Internet. However, in certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Certain user profile aspects are depicted in FIGS. 9 and 10, for example. As shown in FIG. 9, certain embodiments of the gaming system may include software and hardware to enable the provision of user profiles. Accordingly, system 910 includes at least one user 912. Users 912 preferably access system 910 by way of gaming communication devices 913. Gaming communication devices 913 transmit and receive gaming information to and from communications network 916. Gaming information is also transmitted between network 916 and a computer 918, such as a server, which may reside within the domain of a gaming service provider 920. As with the description of system 10 in connection with FIG. 1, this is an example illustration only and it will be readily understood that system 910 may be modified in any number of ways within the scope and spirit of the detailed description. For example, the computer 918 may comprise multiple servers, which may be centralized or distributed. Preferably, system 910 includes at least one database 922. The database(s) 922 may be any suitable database capable of receiving, storing, and/or distributing electronic data.

One or more user profiles 924 are maintained within database 922. Each user profile 924 preferably consists of one or more data files. It should be, however, that the user profiles may be maintained in any form that allows establishment, maintenance, and or updating of the profiles via the transfer of electronic information. It should also be understood that the user profile information may be centralized or distributed and certain portions of user profile information may be maintained at different elements within or without system 910. A graphic user interface ("GUI") 926 may also be provided to enable or assist in the management of information within user profiles 924.

According to at least one embodiment, at least one user profile includes various information corresponding to at least one user of system 910. Such information may include, for example, user-specific information and non-user specific information. User-specific information may include any information that is determined in whole or in part by some characteristic of the user. For example, user-specific information may include information relating to user preferences, activities, habits, location, identity, etc. Non-user specific information may include any information that is not necessarily dictated by user characteristics. Non-user specific information may, however, be associated with one or more users. For example, non-user specific information may include gaming configurations, promotional information, activity schedules, etc.

Preference information may include any information which is at least partially determinative of a user's preferences with respect to at least one aspect of the gaming services. As such, preference information may be at least partially determinative of gaming presentation, gaming configuration, screen or display configuration, available activities, betting limits, service availability, service preferences, notifications, communication preferences, personnel and staff preferences, etc. Activity information may include any information reflecting a user's activities, whether they be gaming or service activities. As such activity information may include such things as indications of activity types during a particular time period, services and or games accessed by the user, applications for credit, funds transfers, service activities (e.g., dining, room service, laundry, car rental, etc.), bets made, win and loss information, cashing out activities, communication with staff, etc. Habit information may include any information reflecting an indication of a habit or trend of activity of a user. Such information may include, for example, increases or decreases in gaming times, bet amounts, frequency of activities, transfer of funds, times in which activities are undertaken, associations between two or more activities, etc. Location information may include any information related to a user's location within a predetermined space. The space may be a jurisdiction, state, region, country, city, casino property, casino gaming area, race track, sports venue, store, hotel, recreation area, restaurant, theater, or any other relevant space. The location information may include associated information such as date, time of day, or other information associated with the location of the user. The location information may include information to reflect location over a certain time period or multiple time periods. The location information may indicate a series of locations, a route, a preferred destination, etc. Identify information may include any information indicative of the identity of the user. Such information may include, for example, name, address, phone number, codes, social security numbers, passwords, user names, login identifications, and biometric information (e.g., retain scan, fingerprint, and voice print information).

Non-user specific information is intended to encompass any information that does not necessarily correspond to a particular user. Such information can include gaming configurations, schedules, available gaming activities or services, displays, menus, announcement content, promotional content, information about other users or non-users (e.g., staff), and the like.

FIG. 10 illustrates an example method 1010 for establishing, maintaining, modifying, and acting on, a user profile. According to a first step 1012, a user profile is initially established. The establishment of the user profile may comprise the creation of one or more data files to include one or more pieces of profile information. The profile information may include, for example, user-specific information such as name, credit information, and identity information. The user information may be any type of information considered or discussed herein. At step 1014, an event occurs, which impacts at least one piece of information within the user profile. At step 1016, the user profile is updated as a result of the event. In certain cases, the user profile is updated to reflect and/or record the occurrence of the event. In other instances, the occurrence of the event merely causes a piece of information to be updated. At step 1018, the user profile is queried to determine the existence of one or more parameters. A parameter may be any suitable piece of information. For example, the query may determine whether any portion of the user profile information matches a piece of information specified by the query. At step 1020, if the response to the query is affirmative, then a response action is initiated. Otherwise, the method returns to step 1014 to accept additional updates of the user profile.

Step 1012 may be accomplished in any number of ways. For example, initial profile information may be entered (e.g., through a GUI), by a data entry person. Initial profile information may include certain base level information necessary for the user to be able to operate a remote gaming device. For instance, initial information may include a name and password. Other information, such as credit information and additional verification information, may be required to access certain gaming activities and services. The profile may be initially created by data entry techniques, or by transfer of information from an external system or application. For example, a casino or hotel may have an existing system to collect certain information about a guest. A casino, for instance, may have a system that maintains information about certain users for purposes of managing comps. A hotel may collect certain information about its guests (e.g., upon check in). The gaming system may be configured to initiate and/or accept a transfer of information from such an external system to the profile data fields.

The event at step 1014 may be any suitable event, which can serve as a trigger to change the profile information. The change may be an addition or deletion of information, or a change to existing information. The event may be, for example, the occurrence of a particular day of the week, or time of day, or a certain time within every hour. The event may be other types of events such as an action by a user. For example, a user event may include such things as a user arriving at a certain location, such as a particular casino or a particular area (e.g., casino floor, pool area, lobby, hotel room, restaurant, theater, store, etc.) within a casino property, a certain jurisdiction (e.g., crossing a particular state border), or a particular game (e.g., a certain slot machine or gaming table). The event may also be the selection, by a user, of a particular gaming activity or service. The event may also be the selection of any menu item offered by the gaming system. For example, the event may be the user's entry of a particular type of bet or a bet amount, or the selection of a particular game, the purchase of services or merchandise, or the attendance of an event such as a show. The event may also be an administrative event, such as check in, check out, establishment of a credit line, the deposit or transfer of gaming funds, or the registration of a user or a device. Any event described or contemplated herein, or which enables or relates to any of the activities described herein, may serve as an event. Events may also include occurrences that are not directly related to user activities. For example, an event may be the start of a tournament or sporting event, or the arrival of a particular staff person at a particular gaming table or other location within a casino property.

Step 1016 may comprise any updating scenario in which any portion of the profile information is updated. Updates may include additions, deletions, or modifications. Updates may be made to information that directly corresponds to the event. For example, a portion of the profile may indicate a user's last bet amount. Thus, a subsequent user bet that is a different amount may cause the last bet amount to be updated. Updates may also be made, however, to portions of the profile that do not directly correspond to the event. For example, a portion of the profile may indicate an average bet amount for a certain time period. A new bet may cause the average bet amount to be updated. The relationship between the event and the portion of the profile being updated may be even more remote. For example, a bet by a user may result in a total amount of bets placed by the user during a certain time period to reach a predetermined amount. This might, in turn, trigger a comp or promotion.

Step 1018 can comprise any suitable type of query scenario. A query may be initiated by an operator, staff person, user, or other individual. The query may be automatically generated based on a certain event. The query may be made at a desired, predetermined time, or at a randomly-selected time. The query may correspond to a particular event. For example, a user's selection of a $100 minimum blackjack table may initiate a query regarding the user's credit limit or past betting styles or preferences. Information entered by a user or another entity may form all or part of a query, or may cause a predetermined query to be initiated. The query may be made to determine what is indicated by a particular portion of the profile. Alternatively, the query may determine whether the profile portion matches a predetermined value (e.g., text, numeric, or other).

At step 1020, the action may comprise any suitable action. An action may also comprise taking no action. An action may directly correspond to the event, or to the portion of the profile being queried. Alternatively, the action may have no direct connection to the event and/or may affect a portion of the profile not being queried. Actions may comprise, for example, enabling or disabling a device, extending credit, accepting an activity selection by a user, accepting a user's bet, updating a profile, generating a report, activating an alert or alarm, establishing a telecommunications link, sending a message, making an offer, conducting a transaction, providing an indication (e.g., win or lose), changing a gaming parameter, initiating or altering a presentation of information to a user, providing a service, etc.

In at least one embodiment, the existence of a certain piece of information (e.g., a trigger) within a given user profile, will cause a modification of the gaming environment, which may be, for example, an alteration of at least one aspect of the gaming activities. For example, a portion of a profile may indicate the last type of game played by a user prior to a user logging off from the system. When the user logs back on, a query may indicate that the last game played by the user was blackjack. The system may, as a result, be triggered to present a blackjack table to the user as a possible activity. As another example, the profile may indicate that the user has always played blackjack at a certain time of day. If a query indicates that the time of day is appropriate, the system may present a blackjack table to the user. Modifications of the gaming environment can comprise any decision or method by which certain activities are presented to the user, as well as the format or way in which those activities are presented. As such, a modification may include enablement, disablement, addition, deletion, modification, etc. of any gaming activity or service described or contemplated herein.

In at least one embodiment, the existence of a piece of profile information will cause a modification of a different piece of the profile. A modification can include any addition, alteration, or deletion of any user profile or portion thereof.

In at least one embodiment, the profile indicates a characteristic, and an action is taken that relates to the characteristic. For example, according to one aspect, the user profile indicates a betting pattern. A betting pattern is intended to encompass any set of data that indicates at least two pieces of information relating to betting. According to one aspect, the betting patter will reflect a betting trend. That is, the betting pattern will reflect an upward or downward movement in the amount of bets. This can include movement in the amount, average amount, acceleration of an increase or decrease, and the like. The pattern can indicate certain betting habits (e.g., amounts bet) at certain times or corresponding to one or more other parameters represented by information within or without the user profile. For instance, the user might make an average $100 minimum blackjack bet between the hours of 8 p.m. and midnight on Saturday nights. These betting patterns and habits may be maintained, cross-linked, reported, or otherwise manipulated to extract intelligence from the raw information contained therein. As with the occurrence of certain pieces of information, the existence of a pattern can trigger any of the various actions discussed elsewhere herein including, for example, a re-verification requirement or the disablement of a gaming device if the betting pattern meets one or more parameters, such as a certain threshold.

According to at least one embodiment, the gaming system is operable to track various debts related to a user's activities. This debt information may be maintained as part of a user profile or may be maintained as a separate data component. The debts can include any type of debt owed by the user to any entity. For example, debts can include money owed as a result of losing at one or more games. Debt can also include bills for merchandise, entertainment (e.g., shows), hotel invoices, restaurant and bar tabs, or any other goods or services which might be associated with or related to a user's activities in connection with the gaming system. The system may be configured to prompt the user, at one or more predetermined or random times, to make a bet regarding all or a portion of the various debts. For example, the prompt may come at a specific time daily (e.g., 1:00 am), or at the occurrence of a specific event (e.g., upon checking out of the hotel). The prompt may allow for the bet to be made according to any number of games. For example, the user might choose to make a bet of 50% of his hotel invoice on a single hand of blackjack. The user might split up the amount(s) being wagered between blackjack and a spin on the roulette wheel.

According to another embodiment, another concept related to user profiles is the maintenance of one or more panic codes are established and maintained for one or more users. The code may be an alpha-numeric code, or a signal triggered by depressing a particular button or series of buttons on the gaming device. The code may be an electronic signal generated by a voice recognition unit ("VRU") in response to a voice command from the user. The code may be a signal generated in response to the unit moving into or out of one or more predetermined locations. The code may be used in any number of ways to initiate a suitable response. For example, security, police, or an emergency response unit may be dispatched automatically to the location of the gaming device. Alternatively, the code may initiate a dialog between a dispatcher and the user of the gaming device. Panic codes may be maintained as part of the user profiles.

According to another embodiment, verification, or re-verification may be based on user profile information. For example, re-verification may be required if the user profile information indicates a change in betting style that falls within or without a certain range or otherwise meets a certain threshold. Similarly, certain activities may be enabled or disabled (or modified) based on user profile information. For example, during a process of cashing out, a user might be required to inform the cashier as to certain details regarding the user's gaming activities. For instance, the user might be required to inform the cashier as to the location and type of game that the user last played. The cashier then compares this information to information stored in the user profile. If the information matches, then the cashing out process may continue. If the information does not match, the cashier may halt the cashing out process and/or request additional information from the user.

As part of a user profile element, the system may be configured to provide certain users with certain information based on the profile information. The information provided to the users may include such things as game rules, strategy and tips (e.g., blackjack optimal play card), payout and odds information, and other ancillary information (e.g., stock ticker information).

According to at least one embodiment, a matching "house" bet may be enabled and may be based on user profile information. For example, the system may be configured to prompt a user (e.g., at a predetermined or random time) to make a bet that the house (or other sponsoring entity) will match. For instance, the house might match a bet, up to a certain amount, for a certain time limit. This can be based on user profile information and/or location. This is an improvement over a scenario that involves sending a mailer to a prospective user, which offers a matching bet on a certain day, when there is no indication whether the prospective user even intends to be in the gaming jurisdiction on that particular day.

According to at least one embodiment, the system and/or the device may include a disabling function. Accordingly, the gaming device may be remotely disabled. This may occur, for instance, if the device is lost or stolen. The device may also be disabled if user profile information indicates a certain set of circumstances. As an example, a drastic change in betting styles may indicate that the user is "out of control," and the device may be configured to terminate playing privileges as a result. As another example, a user might predetermine that he does not want to be able to use the gaming device to gamble during certain times or at certain locations. Alternatively, the house, or other sponsoring entity, might want to disallow certain activities when the user profile information indicates that certain criteria are met. This might be the case, for example, if the user is attending a show, or is in a hotel room. The user profile information may be configured to indicate the user's location. The casino might want to disallow gambling on the device while the user is at the show in order to avoid the user disrupting the show for other attendees. Moreover, jurisdictional requirements may dictate that a user not be able to participate in certain gaming activities if the user is in a certain location, such a casino hotel room.

According to at least one embodiment, an actual and/or virtual casino are configured based on user profile information. Additionally, staff activities may be initiated, or halted based on user profile information.

User profile information may also be used as an element in a fraud detection process. For example, one or more elements of a user's past profile information may be compared to current information. If a difference is detected and falls within a certain range, fraud may be indicated.

Figure 2:
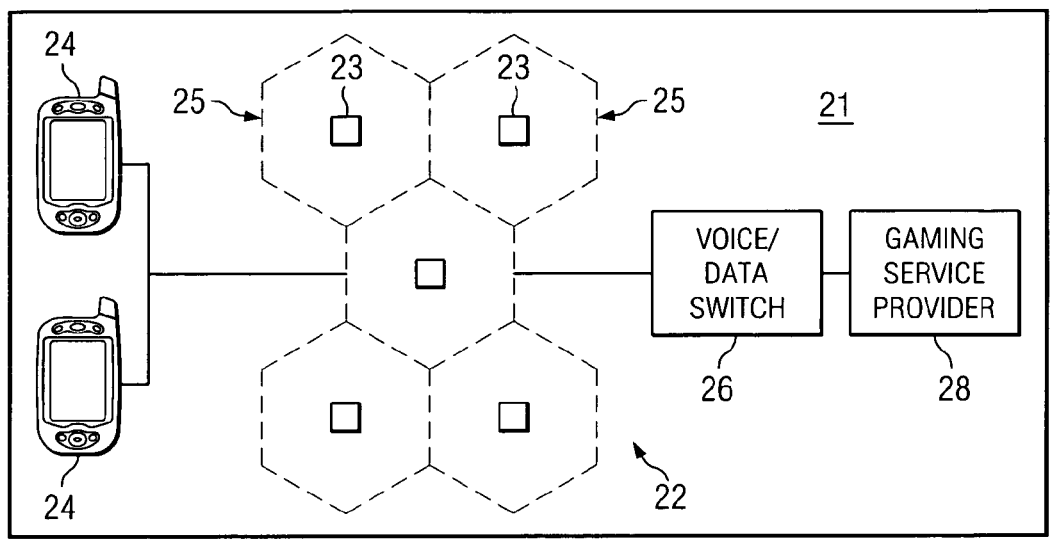
FIG. 2 illustrates a gaming system with a wireless network according to an embodiment of the present invention.

Other aspects of the various embodiments of the wireless gaming system are shown in FIGS. 2-8. According to one embodiment, as shown in FIG. 2 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which is preferably connected to the wireless portion of the network via a dedicated, secure landline. The communications network also includes a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

Preferably, in the case of a cellular network for example, the gaming system is enabled through the use of a private label carrier network. Each base station is programmed by the cellular carrier to send and receive private secure voice and/or data transmissions to and from mobile station handsets. The handsets are preferably pre-programmed with both gaming software and the carrier's authentication software. The base stations communicate via Private T-1 lines to a switch. A gaming service provider leases a private T-1 or T-3 line, which routes the calls back to gaming servers controlled by the gaming service provider. Encryption can be installed on the telephones if required by a gaming regulation authority, such as a gaming commission.

The cellular network is preferably a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices are preferably not allowed to "connect" to the Internet. This ensures a high level of certainty that bets/wagers originate and terminate within the boundaries of the gaming jurisdiction and the "private" wireless system cannot be circumvented or bypassed. Although in certain embodiments some data and/or voice traffic may be communicated at least partially over the Internet, it is preferred that the communication path does not include the Internet. Alternatively, in some embodiments, certain non-gaming information may be transported over a path which includes the Internet, while other information relating to the gaming activities of the system is transported on a path that does not include the Internet.

Figure 3:
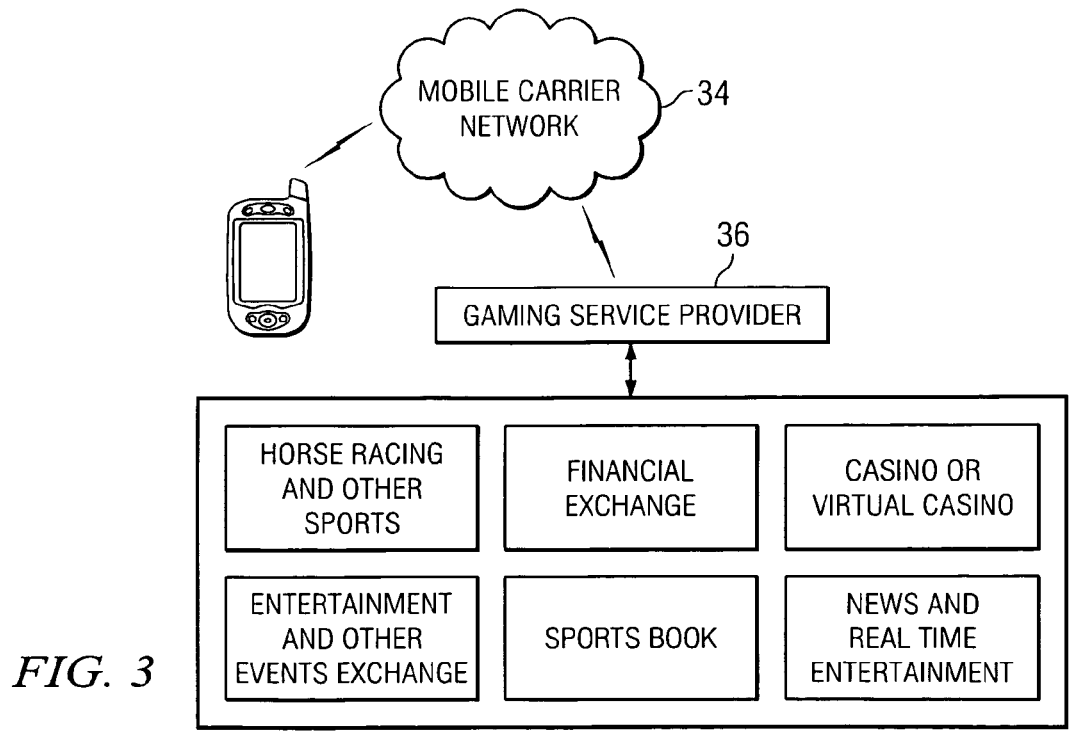
FIG. 3 is a block diagram of a gaming system illustrating various gaming activities in accordance with an embodiment of the present invention.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential gaming or related activities.

Figure 4:
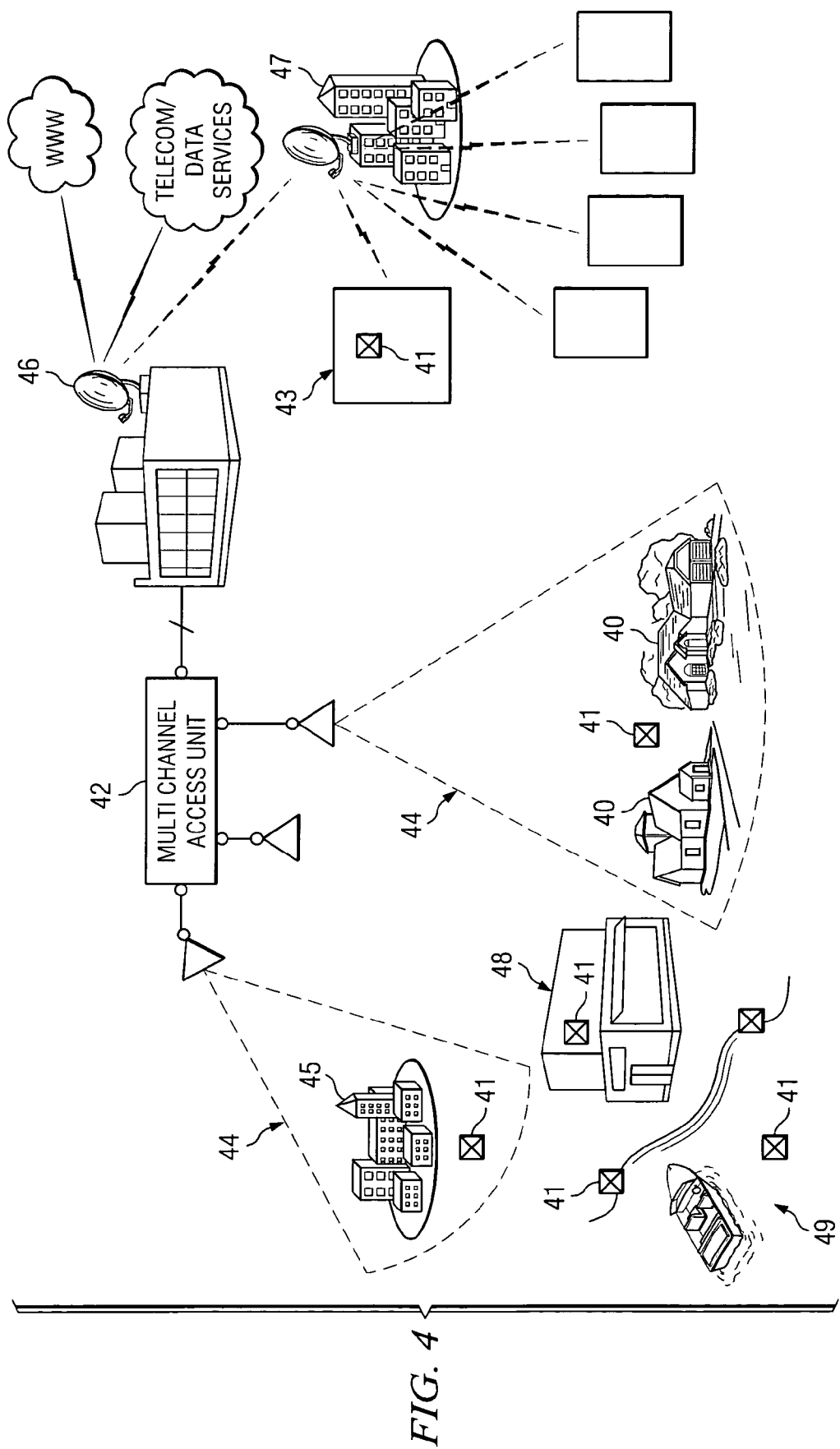
FIG. 4 illustrates a gaming system showing coverage areas in accordance with an embodiment of the present invention.

In another embodiment, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because certain embodiments of the technology cover smaller areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified within the scope of the present invention.

In one embodiment, the system architecture for the gaming system includes:

(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T-1 and T-3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices are preferably WiFi- or WiMax-enabled PDAs or mini-laptops, and do not have to be managed by a third-party partner.

Preferably, the gaming system includes a location verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may included such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In one embodiment, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
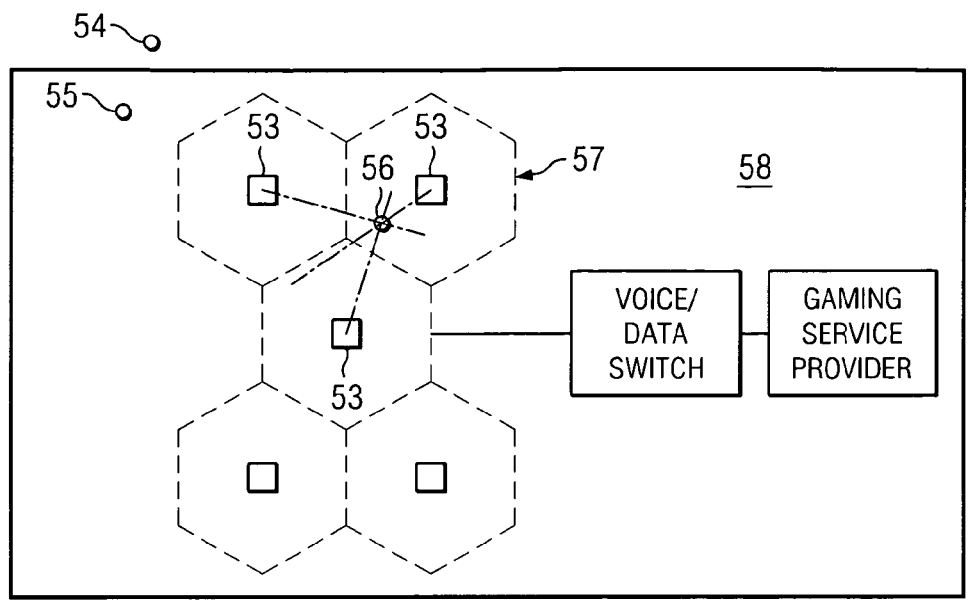
FIG. 5 illustrates a gaming system with a wireless network showing triangulation location determination in accordance with an embodiment of the present invention.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing does not specify location. Rather, it ensures that a mobile station is within certain boundaries. For instance, geo-fencing may be used to ensure that a mobile station beyond state lines does not access the gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In another embodiment, location verification is accomplished using channel address checking or location verification using some other identifying number or piece of information indicative of which network or portion of a network is being accessed by the gaming communication device. Assuming the using of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. Preferably the gaming service provider either maintains, or has access to, a database that maps the various possible worldwide mobile network identifying numbers to geographic areas. The invention contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In another embodiment, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

In connection with FIG. 6, an example embodiment of a method according to the present invention can be described as follows. As discussed, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein.

Figure 6:
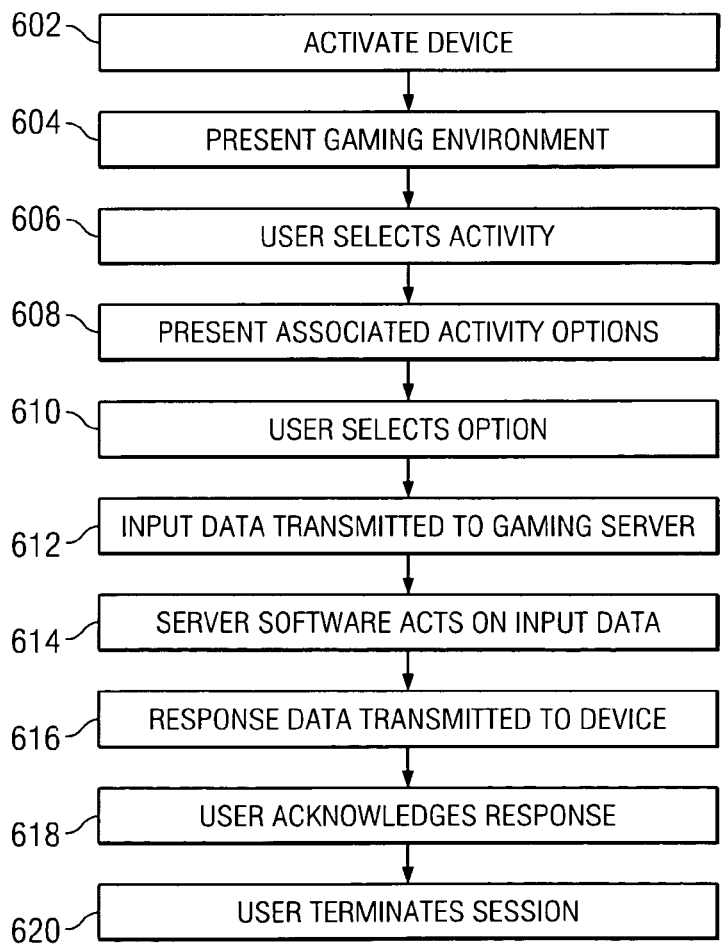
FIG. 6 is a flow chart depicting steps in a gaming method according to an embodiment of the present invention.

In the example method shown in FIG. 6, in a first step 602, the gaming communication device is activated. This may take place as a function of turning on a phone, PDA, or other communication device as described elsewhere herein. Preferably, activation comprises connecting the gaming communication device to a private data network. Part of the activation includes logging in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 604, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby.

In a next step 606, the user selects an activity, such as a particular casino table game. In step 608, the user is presented with one or more options related to the selected activity. In step 610, the user selects an option. For instance, at this point, the user might place a wager, draw a card, select a restaurant or restaurant menu item, select a news source or a news story, place a buy or sell order on a financial exchange, place a bet on a certain box office performance over/under amount for a given movie, etc. The options for user input are myriad. In step 612, the software resident on the gaming communication device accepts the option input by the user and transmits the input data to the software resident at the gaming server. In step 614, the gaming server software acts on the input data.

Actions at this point, may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and in step 616. In step 618, the user acknowledges the response. For example, in the case of gambling, the user might acknowledge that he won a hand of blackjack because the dealer busted and that his payout was $100 based on a $50 bet at even odds. In step 620, the user logs out.

In the situation where the user is gambling, after the series of steps described in connection with FIG. 6, (or a subset or modified series of steps), the user physically enters a casino and goes to a casino cashier for payout and/or settlement (which can include, for example, extensions of credit or advance deposits). In one embodiment, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

The duration of activation of the gaming communication device, the duration of a particular session, and/or the duration of a particular activity may be controlled according to any number of different parameters. For example, the duration may be based on a predetermined amount of time or period of time. Activation of the gaming communication device may terminate upon the expiration of a predetermined time period. As another example, an activity may only be permitted until the occurrence of a particular time of day. According to an alternative, an administrator, or another party to a transaction within any of the various activities, may determine the time period or amount of time. According to yet another alternative, the duration may end upon the occurrence of an event such as the user entering or leaving a particular location. The duration of activation may be dynamically determined based on a period of non-use. In other words, after a predetermined time without being used, the device may "time out" and be deactivated. The period of time, or amount of time, may be cumulatively determined. For example, an activity may only be permitted for a period of five hours, collectively. Time counting toward the five hours might stop and start depending upon the location of the user. As another example, an activity might only be permitted so long as the user does not enter or leave a particular location for longer than a predetermined period of time.

Similarly, activation of the gaming communication device and/or the ability for a user to engage in a particular activity may only be permitted during a specified time of day, or for a particular period of time prior to an event, or for a particular period of time after notification to the user. Also, activation and/or access may be controlled based upon the location of the user. For example, if a user is in a particular casino in which a particular show will take place that evening, the user might be notified that tickets to the show are available for a specified period of time prior to the show. The user might only be permitted to engage in the activity of purchasing tickets for the show if the user is in the casino and during the specified period of time prior to the show. For example, the user might only be able to purchase tickets while in the casino and up to five minutes before the start time of the show. Similarly, the activation of the device may be restricted based on the location of the user and a corresponding period of time. For example, if a user is in a location where a show is occurring, or is going to occur, the device may be deactivated (either automatically, or by a party other than the user) during a period beginning five minutes prior to the show and ending five minutes after the end of the show.

According to another alternative, the duration or enablement of one activity might be determined by the participation of the user in another activity. For example, a user might be allowed to make dinner reservations at a popular restaurant if the user has been gambling enough at a given casino. In this way, bonuses or comps may be determined or managed based on the activity of the user via the gaming communication device.

Figure 7:
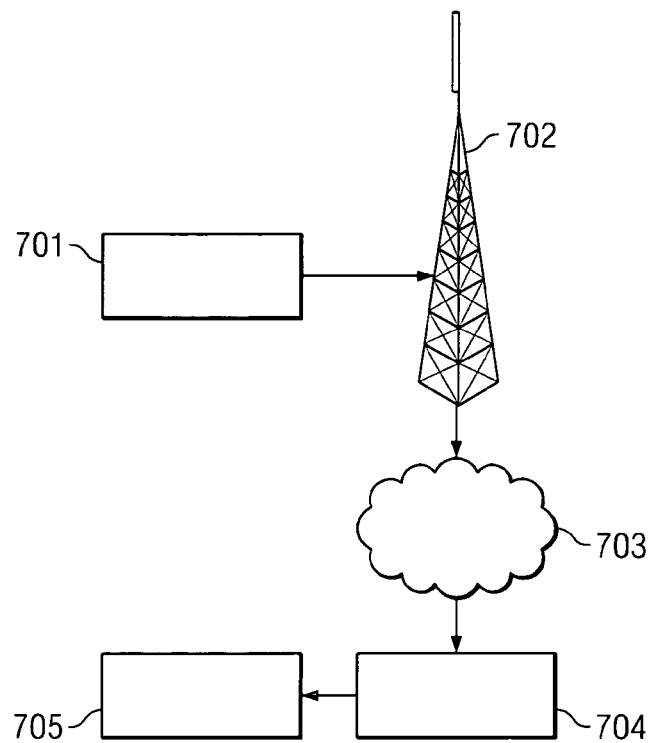
FIG. 7 depicts a gaming system showing a communication path in accordance with an embodiment of the present invention.

Preferably, data is transmitted back and forth during the gaming activities between the gaming communication device and a server controlled by the gaming service provider. An example of the path of communication is shown in FIG. 7. Gaming data, such as a wager placed by the user, is transmitted from gaming communication device 701 to a base station 702 (or a transmitter in the case of a private wireless network such as a WiFi or WiMax network). Base station 702 routes the data through network 703 to a hub or gateway 704, which in turn routes the data to a gaming server 705 operated by a gaming service provider. Preferably, the communication from gaming communication device 701 to the network 703 comprises wireless communication. This may be any type of known wireless communication or any type of wireless communication available in the future. Examples of acceptable wireless communication protocols include CDMA, GSM, and GPRS.

Preferably, the communication from the network 703 to the gateway 704 and to the server 705 is conducted over secure land lines. FIG. 7 is an example communication network only and the present invention should be understood to cover other networks in which data may be transmitted from gaming communication device 701 to server 705. Preferably, data in response to data being transmitted from gaming communication device 701 to server 705 is transmitted back to gaming communication device 701 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino.

With respect to payment and/or receipt of winnings and losses, one possible approach is as follows. Upon check-in at a casino hotel, a hotel representative may query a guest as to whether the guest wants access to a gaming communication device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a gaming session. This may occur, for example, if a user selected a casino cashier activity from the gaming environment and instructed the cashier to add funds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the gaming activities. For example, a user might remotely (via the gaming communication device) place an order at a restaurant. Then, the user might make advance payment for the meal at an ATM-type machine which is operable to receive instructions corresponding to the financial transaction requirements of the gaming activity of ordering food.

A unique aspect of the present invention includes establishing an electronic record of the gaming transactions undertaken by a user. Preferably, this is accomplished by utilization of a keystroke log, which is an electronic record of all keystrokes made by the user. Utilization of a keystroke log in this context allows for unprecedented monitoring of a user's gaming activity. In the event of a dispute, one may refer to the keystroke log and readily determine whether, in fact, a user placed a particular wager, for example.

An additional possible aspect of the electronic record is to allow a gaming control board or other regulatory authority, access to the electronic record in a direct manner in order to conduct periodic independent monitoring of the gaming activities conducted over the system. Another possible aspect is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 8:
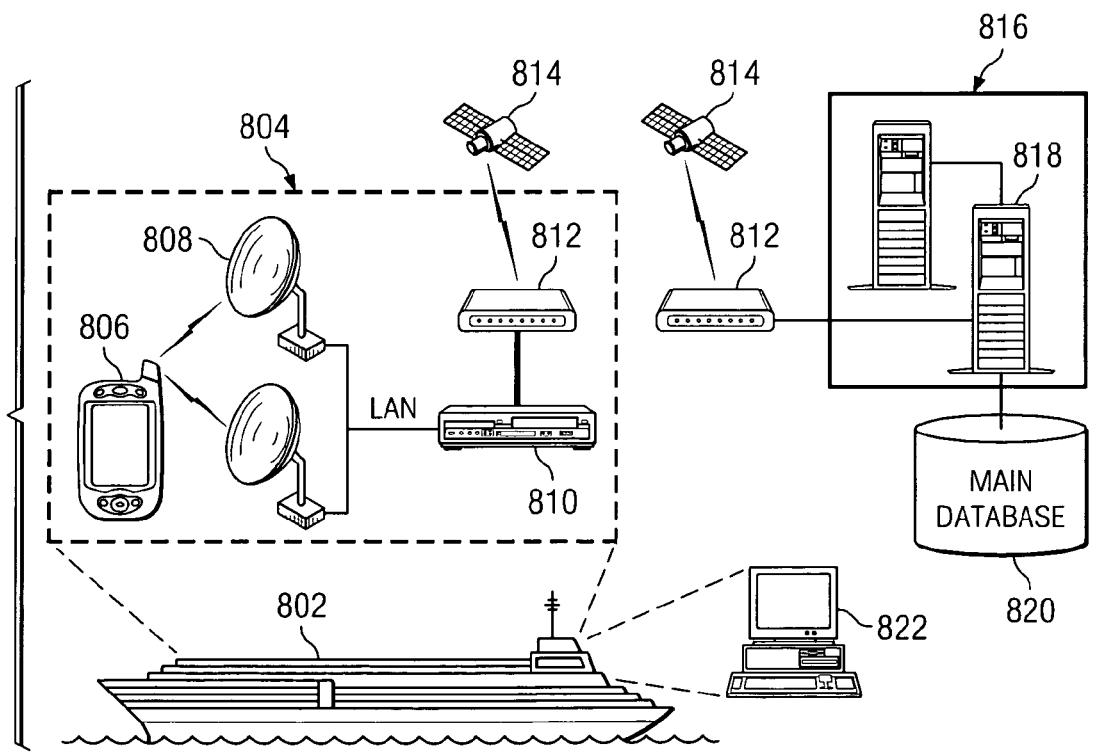
FIG. 8 illustrates a ship-based gaming system in accordance with an embodiment of the present invention.

In another embodiment of the invention, as shown in FIG. 8, a ship-based gaming system is provided. The system preferably comprises passenger vessel 802, such as a cruise liner for example. The system includes one or more gaming communication devices 806 connected to a communication network. The network shown in FIG. 8 comprises a mobile network with base stations 808 connected via a LAN to a base station controller (BSC) 810. BSC 810 is connected via a T1 interface to a first Very Small Aperture Terminal (VSAT) modem 812, which is in communication with a first satellite 814. First satellite 814 is operable to transmit and receive signals from second satellite 814, which is in communication with second VSAT modem 812. Second VSAT modem 812 is in communication with a gaming server 818 located at gaming service provider 816. Gaming server is coupled to gaming database 820. Again, the network configuration depicted in FIG. 8 is for example purposes only, and other configurations are within the scope of the present invention. An on-board back office 822 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions % conducted over the gaming system. In one example scenario the user is in affixed, but remote, location from the gaming server, which may be located on the premises of a casino. This may be include, for instance, a situation in which the gaming communication device is a kiosk or some other communication device which is in a fixed position or which is tethered to a fixed position so that the gaming communication device cannot be moved beyond a certain area. In another example scenario, the user starts a gaming transaction at a first location and ends the transaction at a second location different from the first location. In another example scenario, the user is mobile during a single gaming transaction. In another example scenario, the user is mobile within a first approved area then (during the gaming transaction) the user moves outside the first approved area, through an unapproved area, to a remote second approved area.

In an alternative embodiment, the gaming system may be configured to operate as a "curb-to-curb" gaming system. In such a system, a communication path may be established between the device and a particular server, based upon whether the user is in a location corresponding to that particular server. For example, the user might enter a first casino, or an authorized area associated with the first casino, and thereby activate the establishment of a communication path between the device and a server located at and/or controlled by the first casino. While the user is on the premises of the first casino, the user might be able to participate in activities, such as playing blackjack, at the first casino. Then, if the user leaves the first casino, the gaming system might be configured to terminate the first communication path (i.e., between the device and the first casino's server), or otherwise deactivate the device and/or terminate the user's ability to use the device to participate in activities associated with the first casino. When the user enters a second casino, or an authorized area associated with the second casino, a second communication path (e.g., between the device and a second server located at or controlled by the second casino) may be established. Thus, the user would now be able to play blackjack (or engage in other activities) at the second casino, rather than the first casino.

As another example, a particular casino is often related to other casinos within a jurisdiction or specified area. Under such a scenario, if a user entered any of the related casinos, then the appropriate communication path or paths could be established between the gaming communication device and one or more of the casinos in the group of related casinos, thereby enabling the user to play casino games (or engage in other activities) at the one or more casinos in the group of related casinos. Depending on regulatory requirements, the preferred configuration might be to establish a communication path with a server at a particular casino within the group at which the user wants to play. Then, a different communication path could be established at a subsequent casino if the user wants to play at another casino. Under certain circumstances, and again depending on regulatory requirements, some information associated with user activity might be maintained at a centralized server accessible by more than one casino within the group.

In another example embodiment, the gaming system may be used to enable gaming activities involving multiple wireless users who interact with one another. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the gaming system is the provision of a poker game in which users place bets against one another instead of, or in addition to, placing bets against the house. Another example of interaction between users is when a first user makes restaurant reservations or purchases event tickets, thereby reducing the options available to the second user.

Preferably, the gaming service provider provides at least the following functions. First the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as transaction monitoring and key stroke logging services. The gaming service provider may also provide data management and security services. These services are not intended to be exhaustive and the gaming service provider may provide other services which facilitate the gaming process.

It should be noted that the invention can be implemented in connection with any gaming environment or an environment for any other activity, which may be conducted electronically. The invention is not limited to Nevada or any other particular gaming jurisdiction. For instance, the invention can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the invention might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the invention to participate in remote gaming, while enjoying some other primary activity in a location remote from the gaming facility. Further, the invention is not limited to gaming, but can include other applications, such as trading financial instruments, and wagering on other types of events, such as elections, award events, or any other activity.

Another example embodiment involves the application of one or more of the methods and systems described herein to the activity of conducting financial transactions. Thus, the gaming communication device may be configured to enable a user to conduct such financial transactions, which may include, without limitation, any transaction involving a financial institution, such as banking, trading securities, or managing 401K or other investment fund assets. Preferably, a communication path would be established between the user and any of the servers or other computers necessary to conduct the financial transaction. As with certain other embodiments the ability to engage in this activity may be controlled by one or more parameters including location and/or identity verification and time or duration limits.

Conducting financial transactions may be one of the activities presented to the user of the gaming communication device. Any of the possible financial transactions might be presented as sub-activities. As an example, a user might want to trade securities listed on a particular exchange. Regulations might require the trader to be located within a certain jurisdiction to execute trades on the exchange. The exchange might have its own rules and could require that the trader be located on the premises. With the location verification techniques described elsewhere herein, the particular financial transaction activity might only be enabled if the user is located in a particular geographic area, for example.

As a related feature, the system may be configured to provide a credit verification feature, according to which a user's creditworthiness may be checked by a party to a transaction, or by which the user might apply for credit. For example, if a user wants to purchase $10,000 worth of a particular stock, then a communication path might be established between the user and a server located at and/or controlled by an exchange upon which the stock is being traded. An additional communication path might be established between the exchange server and a server of an account manager that manages the user's account. These communication paths would enable the basic transaction—that of the user purchasing the stock. Yet another communication path, however, might be established between a seller's server, the exchange server, and/or the account manager server and a server located at and/or controlled by a credit agency. This path would enable an interested party to the transaction to check and/or approve the user's credit to prior enabling the transaction.

According to one aspect of certain embodiments, a user of the gaming communication device can connect from the device to a financial service provider's server to provide a "Push to Trade" feature. In order to enable this feature, the device is configured to be capable of facilitating a "Push to Talk" protocol, whereby the device behaves like a walkie-talkie. Thus, the device may include any suitable program or application that enables the Push to Talk feature. As used herein, the phrase "Push to Talk" includes any protocol that allows for a direct connection feature for an end user. Included are all such protocols (e.g. Instant Talk, Fastchat, etc.) within the broad rubric of "Push to Talk" including those that provide wide-area, instantaneous contact.

The Push to Talk protocol allows a given device to instantly connect to any number of other devices, such as any other telephone (mobile or landline-based), personal computer, laptop, etc. The connection for the end user does not have to be spawned by any conventional dialing or by triggering some form of automatic dialing. A simple button can be depressed to provide the requisite connection. In the context of timing, Nextel (who developed the original Push to Talk technology) suggests that their Push to Talk protocol should connect within 2 seconds.

A related technology is Push to Talk Over Cellular (PoC). PoC service is a form of interactive voice messaging that combines walkie-talkie and cellular phone connectivity, allowing users to quickly connect with another person or an entire group of friends and contacts at the push of a button on a PoC-enabled handset.

The Push to Talk protocol allows users to use the walkie-talkie paradigm over an IP or a cellular network, which diminishes the boundary limitations of a conventional two-way radio. The Push to Talk service is based on a disruptive technology. Latency is an issue during some traditional mobile telephone conversations. One appeal of the Push to Talk platform, as compared to executing a traditional telephone call, is being able to talk to an individual or to a group of individuals instantly, without waiting for someone to answer due to latency issues. Another benefit of the Push to Talk feature is a shorter than normal phone call, which cuts down on dialing costs for corresponding end users. Nextel estimates that the average Push to Talk call lasts forty seconds. Push to Talk technology is compatible with virtually any network communications; for example, the Push to Talk protocol may readily be used in conjunction with cellular telephone networks, including GSM and CDMA. The network equipment used for the Push to Talk feature is currently being offered by companies such as Ericsson Motorola, Siemens, Sony Ericsson, and Nextel.

Because Push to Talk effectively turns the handheld device into a walkie-talkie, it not only successfully enables end users to send voice messages, it also enables immediate data texts (commonly referred to as "direct messaging"). Push to Talk messaging represents a significant improvement over short messaging systems in bypassing the slow and clumsy process of entering text via a phone keypad. This makes text messaging quicker and more effective.

According to the "Push to Trade" feature, once the end user initiates the call, the financial service provider is instantly connected to the end user. In one embodiment, the financial service provider has one or more electronic trade desks that are dedicated to this feature for their clients. Thus, all "Push to Trade" requests may be received at this location. In other embodiments, any suitable entity, broker, standard trading desk, or electronic device may receive such Push to Trade communications.

Once the connection has been established, the financial service provider may then simply conduct the trade as prescribed by the end user. For example, upon connection, the end user may be presented with the financial or market environment in which he seeks to participate. The trade desk representative or device can query the end user to execute an electronic or a broker-assisted trade. In addition, the financial environment may be presented in various stages. For instance, in a first stage, the financial environment may comprise a financial summary of all markets where the user is presented with certain financial options including, for example, specific market summaries, specific prices for selected assets (e.g. commodities, stocks, bonds, etc.), current positions, buying power, etc. In a subsequent stage, the user may be presented with optional instances of the type of activity selected from the market platform.

From this platform, the end user can select an activity, such as a particular type of trade. Thus, the user is presented with one or more options related to the selected activity. For instance, at this point, the user might place a buy or a sell order on a financial exchange. The software, which may be resident on the device, on the server, or on a combination of both, accepts the option input by the user and transmits the input data to the financial service provider. Subsequently, the financial service provider acts on the input data. The Push to Talk technology readily accommodates a voice log of the transaction for audit or confirmation purposes. Hence, a digital voice storage may be provided, whereby the transaction (e.g., inclusive of bid and ask prices) is recorded. In addition, the automatic voice log can then relay this information back to the end user (e.g., via his e-mail or via a conventional postal mail service). This could occur as a matter of course such that the end user is routinely provided with a suitable confirmation receipt for all of his trading activity.

Actions at this point may include, without limitation, determining an outcome and/or amount for the trade, accessing another server and/or software application, retrieving additional information, preparing a suitable response to the user, etc. The action of determining an outcome and/or amount might take place, for example, if the user is using the device to place trades in conjunction with his account and a given exchange. Hence, this could include a formal tallying of the executed trade, inclusive of the charged commission, the amount debited from the account to cover the trade, etc. The action of accessing another server and/or software application might occur, for example, in the event the user is engaging in a services activity such as accessing news services. The action of retrieving information might occur when the financial software is prompted to access another server for the purpose of retrieving a certain type of information requested by the user. The financial service provider can then prepare a response to the user's input data. Once this activity has concluded, the user can acknowledge the response and then log out and terminate his session.

It should be noted that the "Push to Trade" feature can be used in other applications of the gaming technology described herein. For example, in an application where the user of the gaming communication device is playing blackjack from an authorized area outside the casino gaming area, the Push to Trade feature would enable the user to participate audibly in the blackjack game actually taking place within the casino gaming area. The Push to Talk technology would allow the user to immediately and virtually "sit down" at an actual blackjack table without the delay caused by the conventional setup and tear down process of certain traditional telecommunication protocols. Also, once the user is participating in the game, the user can communicate orally with the dealer, or other users that are physically at the table, without the latency issues of certain mobile telecommunication systems.

In at least one embodiment, the invention provides jurisdictional controls, which limit gaming to approved geographical areas. The invention may also include an age/identity verification feature. This can be accomplished through any applicable technique including retina scanning, finger print identification, voice print matching, or other biometrics.

Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. Identity verification can also be accomplished by monitoring a keystroke characteristic (e.g., rhythm, patterns, or cadence) of the user, or any other method in which a parameter uniquely associated with the user can be observed. The invention may also provide for the logging of keystrokes. In at least one embodiment, all communications are accomplished without accessing the Internet.

Mobile, remote gaming may be desirable for many reasons, some of which have already been described. The invention may allow supplementation of existing in-house gaming revenue by allowing bettors to place bets while enjoying other leisure activities such as golf, swimming, dining and shows. The invention may complement the new coinless wagering environment as bettors can play their favorite games outside the casino. The invention provides a high-speed, reliable, accurate, and secure mobile gaming environment that complies with regulatory requirements for identification and location verification of the bettor with the ability to generate key stroke logs. The invention may restrict unauthorized usage from a geographic perspective and is capable of implementation using location verification technology (e.g., geo-fencing) to conform the gaming activities to legal parameters.

Consumers may benefit from an increased choice of gaming environments. Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the invention to increase their revenue base through a new, regulated, mobile, remote channel. Customers wanting to be entertained during downtime or outside a casino will be able to play games on their gaming communication device and customers intimidated by a traditional casino environment will be able to play in private. The gaming jurisdictions may benefit from an increase in gaming an ancillary revenue growth because customers will have a more enjoyable experience.

The invention may also be used to deliver content at an increased speed compared to traditional telecommunications systems. The content may include, for example, live reports, entertainment, news, promotions and advertising.

As mentioned, the invention provides a mobile gaming environment that complies with regulatory requirements for identification and location verification of the bettor. Moreover, the system is designed to be one hundred percent "clean" from a regulatory perspective. The software is clean in that it has not been and will not be licensed to anyone who does business illegally or otherwise operates in a "gray" area. For example, in a preferred embodiment, the software is not licensed to an entity that will illegally operate the software, or otherwise illegally do business, on the Internet. This may be desirable in that certain gaming jurisdictions will not grant gaming permits or licenses to companies that do business with, or license technology to or from, other entities known to be engaging in illegal operations.

Preferably, the system is designed such that the gaming software (or other application software operating on the system) is also one hundred percent clean from a regulatory perspective. For instance, before granting a license, a gaming jurisdiction may require that the software being used is not tainted in that it has not been used by the license applicant in violation of any laws and has not been licensed or otherwise distributed or disseminated to others who have used the software for illegal purposes, or who have been engaging in illegal activity. Therefore, it is preferred that the gaming software be clean and untainted from this perspective.

The systems and methods described herein may also be used to deliver and/or access "Rich Media" content such as, for example, sports video (live or nearly live) and audio commentary. Such may often only be distributed within specific jurisdictions. Therefore, the distribution may benefit from the inventive aspects discussed herein, particularly the location verification aspect, such as geofencing.

The gaming system and methods described herein may permit, among other things, pari-mutuel wagering, sports betting, and dissemination of news and other content. The invention also enables a casino or other gaming provider to advertise ancillary services such as shows, bars, and restaurants. The invention also enables remote reservations and purchases in connection with such services.

According to an embodiment of the invention, the gaming system provides for the dissemination of real-time odds to users accessing the system.

In another embodiment, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. An apparatus comprising:
   at least one processor; and
   at least one data storage device electronically coupled to the at least one processor, the at least one data storage device operable to store:
   a program, and
   at least one profile associated with a user of a gaming device, the gaming device being operable to make a plurality of gaming activities available to the user for play via the gaming device; and
   wherein the program, when executed by the at least one processor, makes the at least one processor operable to at least;
   update the user's profile to reflect a first success level of the user in playing a first of the plurality of gaming activities via the gaming device during a first gaming session;
   in response to a start of a second gaming session that is subsequent to a termination of the first gaming session:
      determine from the user's profile at least the first success level of the user in playing the first gaming activity during the first gaming session;
      based at least in part on the first success level, modify a gaming environment, wherein the modification includes a change as to how the first gaming activity is presented to the user as a possible gaming activity that the user may play via the gaming device during the second gaming session; and
present to the user, via the gaming device, the first gaming activity according to the modified gaming environment.

2. The apparatus of claim 1,
wherein the gaming device comprises a mobile gaming device; and
wherein the program, when executed by the at least one processor, makes the at least one processor further operable to at least:
determine a plurality of locations of the gaming device as the user and the gaming device move; and
store in the user's profile the plurality of locations.

3. The apparatus of claim 2, wherein the program, when executed by the at least one processor, makes the at least one processor further operable to at least:
store for the plurality of locations at least one of a date and a time of day at which the gaming device was at the respective location.

4. The apparatus of claim 2, wherein the plurality of locations indicate a route taken by the user and the gaming device.

5. The apparatus of claim 1, wherein the program, when executed by the at least one processor, makes the at least one processor further operable to at least:
receive from the user a selection of one of the plurality of gaming activities, the selected gaming activity having a minimum betting limit of a given size; and
based at least in part on the size of the minimum betting limit, determine from the user's profile a past betting style of the user.

6. The apparatus of claim 1, wherein the program, when executed by the at least one processor, makes the at least one processor further operable to at least:
store, in the user's profile, information relating to betting by the user, wherein the information indicates a betting habit of the user.

7. The apparatus of claim 1, wherein the program, when executed by the at least one processor, makes the at least one processor further operable to at least:
determine at least one betting trend based at least in part on information relating to betting occurring via the gaming device.

8. The apparatus of claim 7, wherein the at least one betting trend comprises a directional movement in a betting amount occurring via the gaming device.

9. The apparatus of claim 7, wherein the at least on betting trend comprises an acceleration of an increase or decrease in a betting amount occurring via the gaming device.

10. The apparatus of claim 7, wherein the program, when executed by the at least one processor, makes the at least one processor further operable to at least:
based at least in part on the betting trend, cause the user to re-verify an identity of the user.

11. The apparatus of claim 10, wherein to cause the user to re-verify the identity of the user comprises to cause the user to re-verify information associated with the user's ability to access the gaming device.

12. The apparatus of claim 11, wherein the re-verification information comprises identity information.

13. The apparatus of claim 7, wherein the program, when executed by the at least one processor, makes the at least one processor further operable to at least:
based at least in part on the betting trend, cause a disablement of the gaming device.

14. The apparatus of claim 7, wherein the program, when executed by the at least one processor, makes the at least one processor further operable to at least:
based at least in part on the betting trend, cause a player of the gaming device to verify that the player is the user.

15. The apparatus of claim 1,
wherein the program, when executed by the at least one processor, makes the at least one processor further operable to at least:
determine from the user's profile that a majority of time that the user played the first gaming activity during the first gaming session, the first gaming activity had a minimum betting limit of a first amount; and
wherein to modify the gaming environment further comprises to:
based at least in part on determining that the majority of time that the user played the first gaming activity during the first gaming session the first gaming activity had the minimum betting limit of the first amount, modify the gaming environment such that the first gaming activity is presented to the user as having a minimum betting limit of the first amount.

16. The apparatus of claim 1, wherein the program, when executed by the at least one processor, makes the at least one processor further operable to at least:
determine from the user's profile data indicative of at least one debt owed by the user; and
display to the user via the gaming device an offer for the user to make a bet of at least a portion of the at least one debt owed by the user on at least one of the plurality of gaming activities.

17. The apparatus of claim 16, wherein the at least one debt comprises at least one:
a restaurant tab,
a bar tab,
a hotel invoice,
a bill for purchased merchandise, and
a bill for a show.

18. The apparatus of claim 1, wherein the program, when executed by the at least one processor, makes the at least one processor further operable to at least:
display to the user via the gaming device an invitation for the user to make a bet that will be matched by a casino.

19. The apparatus of claim 1,
wherein to update the user's profile to reflect the first success level of the user in playing the first gaming activity comprises to update the user's profile to reflect that the user was successful in playing the first gaming activity;
wherein the program, when executed by the at least one processor, makes the at least one processor further operable to at least:
update the user's profile to reflect that the user was not successful in playing a second of the plurality of gaming activities via the gaming device during the first gaming session; and
in response to the start of the second gaming session, determine that the player was successful in playing the first gaming activity and not successful in playing the second gaming activity during the first gaming session; and
wherein to modify the gaming environment comprises to modify the gaming environment based at least in part on determining that the player was successful in playing the first gaming activity and not successful in playing the second gaming activity during the first gaming session.

20. The apparatus of claim 19,
wherein to update the user's profile to reflect that the user was successful in playing the first gaming activity comprises to update the user's profile to reflect that the user won money in playing the first gaming activity; and
wherein to update the user's profile to reflect that the user was not successful in playing the second gaming activity comprises to update the user's profile to reflect that the user lost money in playing the second gaming activity.

21. The apparatus of claim 1, wherein the termination of the first gaming session and the start of the second gaming session are associated with a logging off of the user from the apparatus and a logging in of the user to the apparatus, respectively.

22. The apparatus of claim 1, wherein the gaming device comprises a mobile handheld device.

23. The apparatus of claim 1, wherein the first gaming activity and the second gaming activity each comprises at least one of:
a gambling activity, and
wagering on a sporting event.

24. An apparatus comprising:
at least one data storage device operable to store:
a program, and
at least one profile associated with a user of a gaming device, the gaming device being operable to make a plurality of gaming activities available to the user for play via the gaming device; and
at least one processor electronically coupled to the at least one data storage device; and
wherein the program, when executed by the at least one processor, makes the at least one processor operable to at least:
update the user's profile to indicate a last one of the plurality of gaming activities played by the user during a first gaming session via the gaming device, and prior to a termination of the first gaming session; and
in response to a start of a second gaming session that is subsequent to the termination of the first gaming session:
determine from the user's profile the last gaming activity played by the user during the first gaming session;
based at least in part on determining the last gaming activity played by the user during the first gaming session, modify a gaming environment, wherein the modification includes a change as to how the last gaming activity is presented to the user as a possible gaming activity that the user may play via the gaming device during the second gaming session; and
present to the user, via the gaming device, the last gaming activity according to the modified gaming environment.

25. The apparatus of claim 24,
wherein the gaming device comprises a mobile gaming device; and
wherein the program, when executed by the at least one processor, makes the at least one processor further operable to at least:
determine a plurality of locations of the gaming device as the user and the gaming device move; and
store in the user's profile the plurality of locations.

26. The apparatus of claim 25, wherein the program, when execute by the at least one processor, makes the at least one processor further operable to at least:
store for the plurality of locations at least one of a date and a time of day at which the gaming device was at the respective location.

27. The apparatus of claim 25, wherein the plurality of locations indicate a route taken by the user and the gaming device.

28. The apparatus of claim 24, wherein the program, when executed by the at least one processor, makes the at least one processor further operable to at least:
receive from the user a selection of one of the plurality of gaming activities the selected gaming activity having a minimum betting limit of a given size; and
based at least in part on the size of the minimum betting limit, determine from the user's profile a past betting style of the user.

29. The apparatus of claim 24, wherein the program, when executed by the at least one processor, makes the at least one processor further operable to at least:
store, in the user's profile, information relating to betting by the user, wherein the information indicates a betting habit of the user.

30. The apparatus of claim 24, wherein the program, when executed by the at least one processor, makes the at least one processor further operable to at least:
determine at least one betting trend based at least in part on information relating to betting occuring via the gaming device.

31. The apparatus of claim 30, wherein the at least one betting trend comprises a directional movement in a betting amount occurring via the gaming device.

32. The apparatus of claim 30, wherein the at least one betting trend comprises an acceleration of an increase or decrease in a betting amount occurring via the gaming device.

33. The apparatus of claim 30, wherein the program, when executed by the at least one processor, makes the at least one processor further operable to at least:
based at least in part on the betting trend, cause the user to re-verify an identity of the user.

34. The apparatus of claim 33, wherein to cause the user to re-verify the identity of the user comprises to cause the user to re-verify information associated with the user's ability to access the gaming device.

35. The apparatus of claim 34, wherein the re-verification information comprises identity information.

36. The apparatus of claim 30, wherein the program, when executed by the at least one processor, makes the at least one processor further operable to at least:
based at least in part on the betting trend, cause a disablement of the gaming device.

37. The apparatus of claim 30, wherein the program, when executed by the at least one processor, makes the at least one processor further operable to at least:
based at least in part on the betting trend, cause a player of the gaming device to verify that the player is the user.

38. The apparatus of claim 24, wherein the program, when executed by the at least one processor, makes the at least one processor further operable to at least:
determine from the user's profile that a majority of time that the user played a given gaming activity during a given gaming session, the given gaming activity had a minimum betting limit of a given amount; and
in a subsequent gaming session that is after the given gaming session, present to the user, via the gaming device, the given gaming activity as a possible gaming activity that the user may play via the gaming device during the subsequent gaming session, and wherein the given gaming activity is presented to the user as having a minimum betting limit of the given amount.

39. The apparatus of claim 24, wherein the program, when executed by the at least one processor, makes the at least one processor further operable to at least:
determine from the user's profile data indicative of at least one debt owed by the user; and
display to the user via the gaming device an offer for the user to make a bet of at least a portion of the at least one debt owed by the user on at least one of the plurality of gaming activities.

40. The apparatus of claim 39, wherein the at least one debt comprises at least one:
a restaurant tab,
a bar tab,
a hotel invoice,
a bill for purchased merchandise, and
a bill for a show.

41. The apparatus of claim 24, wherein the program, when executed by the at least one processor, makes the at least one processor further operable to at least:
display to the user via the gaming device an invitation for the user to make a bet that will be matched by a casino.

42. The apparatus of claim 24, wherein the termination of the first gaming session and the start of the second gaming session are associated with a logging off of the user from the apparatus and a logging in of the user to the apparatus, respectively.

43. The apparatus of claim 24, wherein the gaming device comprises a mobile handheld device.

44. The apparatus of claim 24, wherein the last gaming activity comprises at least one of:
a gambling activity, and
wagering on a sporting event.

45. An apparatus comprising:
at least one data storage device operable to store:
a program; and
at least one profile associated with a user of a gaming device, the gaming device being operable to make a plurality of gaming activities available to the user for play via the gaming device; and
at least one processor electronically coupled to the at least one data storage device; and
wherein the program, when executed by the at least one processor, makes the at least one processor operable to at least:
in response to a start of a gaming session:
determine from the user's profile that the user plays a first of the plurality of gaming activities at a certain time of day;
determine a current time of day;
determine that the current time of day corresponds to the certain time of day;
based at least in part on determining that the current time of day corresponds to the certain time of day, modify a gaming environment, wherein the modification includes a change as to how the first gaming activity is presented to the user as a possible gaming activity that the user may play via the gaming device during the gaming session; and
present to the user via, the gaming device, the first gaming activity according to the modified gaming environment.

46. The apparatus of claim 45,
wherein the gaming device comprises a mobile gaming device; and
wherein the program, when executed by the at least one processor, makes the at least one processor further operable to at least:
determine a plurality of locations of the gaming device as the user and the gaming device move; and
store in the user's profile the plurality of locations.

47. The apparatus of claim 46, wherein the program, when execute by the at least one processor, makes the at least one processor further operable to at least:
store for the plurality of locations at least one of a date and a time of day at which the gaming device was at the respective location.

48. The apparatus of claim 46, wherein the plurality of locations indicate a route taken by the user and the gaming device.

49. The apparatus of claim 45, wherein the program, when executed by the at least one processor, makes the at least one processor further operable to at least:
receive from the user a selection of one of the plurality of gaming activities, the selected gaming activity having a minimum betting limit of a given size; and
based at least in part on the size of the minimum betting limit, determine from the user's profile a past betting style of the user.

50. The apparatus of claim 45, wherein the program, when executed by the at least one processor, makes the at least one processor further operable to at least:
store, in the user's profile, information relating to betting by the user, wherein the information indicates a betting habit of the user.

51. The apparatus of claim 45, wherein the program, when executed by the at least one processor, makes the at least one processor further operable to at least:
determine at least one betting trend based at least in part on information relating to betting occurring via the gaming device.

52. The apparatus of claim 51, wherein the at least one betting trend comprises a directional movement in a betting amount occurring via the gaming device.

53. The apparatus of claim 51, wherein the at least one betting trend comprises an acceleration of an increase or decrease in a betting amount occurring via the gaming device.

54. The apparatus of claim 51, wherein the program, when executed by the at least one processor, makes the at least one processor further operable to at least:
based at least in part on the betting trend, cause a player of the gaming device to verify that the player is the user.

55. The apparatus of claim 51, wherein the program, when executed by the at least one processor, makes the at least one processor further operable to at least:
based at least in part on the betting trend, cause a disablement of the gaming device.

56. The apparatus of claim 51, wherein the program, when executed by the at least one processor, makes the at least one processor further operable to at least:
based at least in part on the betting trend, cause the user to re-verify an identity of the user.

57. The apparatus of claim 56, wherein to cause the user to re-verify the identity of the user comprises to cause the user to re-verify information associated with the user's ability to access the gaming device.

58. The apparatus of claim 57, wherein the re-verification information comprises identity information.

59. The apparatus of claim 45, wherein the program, when executed by the at least one processor, makes the at least one processor further operable to at least:

determine from the user's profile that a majority of time that the user played a given gaming activity during a given gaming session, the given gaming activity had a minimum betting limit of a given amount; and in a subsequent gaming session that is after the given gaming session, present to the user, via the gaming device, the given gaming activity as a possible gaming activity that the user may play via the gaming device during the subsequent gaming session, and wherein the given gaming activity is presented to the user as having a minimum betting limit of the given amount.

60. The apparatus of claim 45, wherein the program, when executed by the at least one processor, makes the at least one processor further operable to at least:

determine from the user's profile data indicative of at least one debt owed by the user; and display to the user via the gaming device an offer for the user to make a bet of at least a portion of the at least one debt owed by the user on at least one of the plurality of gaming activities.

61. The apparatus of claim 60, wherein the at least one debt comprises at least one:

a restaurant tab,
a bar tab,
a hotel invoice,
a bill for purchased merchandise, and
a bill for a show.

62. The apparatus of claim 45, wherein the program, when executed by the at least one processor, makes the at least one processor further operable to at least:

display to the user via the gaming device an invitation for the user to make a bet that will be matched by a casino.

63. The apparatus of claim 45, wherein the start of the gaming session is associated with a logging in of the user to the apparatus.

64. The apparatus of claim 45, wherein the gaming device comprises a mobile handheld device.

65. The apparatus of claim 45, wherein the first gaming activity comprises at least one of:

a gambling activity, and
wagering on a sporting event.

* * * * *